United States Patent
Ishihara et al.

(10) Patent No.: US 9,024,728 B2
(45) Date of Patent: May 5, 2015

(54) REMOTE ACTIVATING DEVICE

(75) Inventors: Takeshi Ishihara, Kanagawa-ken (JP);
Kotaro Ise, Kanagawa-ken (JP);
Yuichiro Oyama, Tokyo (JP); Takaomi Murakami, Tokyo (JP); Naohisa Shibuya, Kanagawa-ken (JP); Eiji Kamagata, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 466 days.

(21) Appl. No.: 13/233,389

(22) Filed: Sep. 15, 2011

(65) Prior Publication Data
US 2012/0081212 A1 Apr. 5, 2012

(30) Foreign Application Priority Data
Sep. 30, 2010 (JP) ................................. 2010-220217

(51) Int. Cl.
*H04Q 5/22* (2006.01)
*H04L 12/12* (2006.01)

(52) U.S. Cl.
CPC ................. *H04L 12/12* (2013.01); *Y02B 60/34* (2013.01); *Y02B 60/32* (2013.01)

(58) Field of Classification Search
USPC ....................................................... 340/10.4
See application file for complete search history.

(56) References Cited

U.S. PATENT DOCUMENTS

| 6,577,229 | B1 * | 6/2003 | Bonneau et al. | 340/10.41 |
| 6,577,299 | B1 * | 6/2003 | Schiller et al. | 345/179 |
| 7,293,110 | B2 * | 11/2007 | Dowling | 709/249 |
| 2008/0137572 | A1 * | 6/2008 | Park et al. | 370/310 |
| 2008/0294792 | A1 * | 11/2008 | Huang et al. | 709/232 |

FOREIGN PATENT DOCUMENTS

| JP | 2009-129242 | | 6/2009 |
| JP | 2009129242 A | * | 6/2009 |

* cited by examiner

*Primary Examiner* — George Bugg
*Assistant Examiner* — Anthony D Afrifa-Kyei
(74) *Attorney, Agent, or Firm* — Nixon & Vanderhye, P.C.

(57) ABSTRACT

A remote activating device remotely activates a device to be activated connected to a first network and a second network. The remote activating device includes a first interface connected to the first network, a second interface connected to the second network, an arrival confirmation processing unit that transmits an arrival attribute confirmation signal to the device to be activated using the first interface and confirms whether or not the arrival attribute confirmation signal has arrived at the device to be activated, and a judging unit that decides the first interface as an activation signal transmitting interface when the arrival attribute confirmation signal has arrived at the device to be activated and decides the second interface as the activation signal transmitting interface when the arrival attribute confirmation signal has not arrived at the device to be activated.

12 Claims, 27 Drawing Sheets

| RECEPTION |
|:-:|
| O |

FIG.4A

| RECEPTION | SIGNAL INTENSITY | ERROR RATE |
|:-:|:-:|:-:|
| O | X | Y |

FIG.4B

| I/F | RECEPTION |
|:-:|:-:|
| FIRST | O |

FIG.4C

| I/F | RECEPTION |
|---|---|
| FIRST | O |

FIG.5A

| I/F | RECEPTION | SIGNAL INTENSITY | ERROR RATE |
|---|---|---|---|
| FIRST | O | X | Y |

FIG.5B

| ACTIVATED DEVICE ID | ACTIVATION SIGNAL TRANSMITTING I/F |
|---|---|
| 200A | SECOND |
| 200B | FIRST |
| ... | ... |

FIG.6A

| STANDBY I/F | FIRST |
|---|---|

FIG.6B

| I/F | RECEPTION |
|---|---|
| FIRST | ○ |
| THIRD | ○ |
| FOURTH | × |

FIG.11A

| I/F | RECEPTION | SIGNAL INTENSITY | ERROR RATE |
|---|---|---|---|
| FIRST | ○ | Xa | Ya |
| THIRD | ○ | Xb | Yb |
| FOURTH | × | Xc | Yc |

FIG.11B

| NUMBER OF TIMES OF RECEPTION |
|---|
| M |

FIG.13A

| NUMBER OF TIMES OF RECEPTION | AVERAGE SIGNAL INTENSITY | AVERAGE ERROR RATE |
|---|---|---|
| M | X | Y |

FIG.13B

| I/F | NUMBER OF TIMES OF RECEPTION |
|---|---|
| FIRST | M1 |
| THIRD | M3 |
| FOURTH | M4 |

FIG.13C

| I/F | NUMBER OF TIMES OF RECEPTION | AVERAGE SIGNAL INTENSITY | AVERAGE ERROR RATE |
|---|---|---|---|
| FIRST | M1 | X1 | Y1 |
| THIRD | M3 | X3 | Y3 |
| FOURTH | M4 | X4 | Y4 |

FIG.13D

| ACTIVATED DEVICE ID | ACTIVATION SIGNAL TRANSMITTING I/F | NUMBER OF TIMES OF TRANSMISSION |
|---|---|---|
| 200A | SECOND | 1 |
| 200B | FIRST | 3 |
| ... | ... | ... |

FIG.20

| ACTIVATING DEVICE ID (COLUMN 2011) | I/F (COLUMN 2012) |
|---|---|
| 2100A | SECOND |
| 2100B | FIRST |

ENTRY 2001
ENTRY 2002

| ACTIVATED DEVICE ID | ACTIVATING DEVICE ID | TRANSMITTING NET | RECEIVING NET |
|---|---|---|---|
| 2200A | 2100A | FIRST | FIRST |
| 2200A | 2100B | SECOND | FIRST |
| 2200B | 2100A | SECOND | FIRST |
| 2200B | 2100B | FIRST | FIRST |
| ... | ... | ... | ... |

ENTRY 2101
ENTRY 2102
ENTRY 2103
ENTRY 2104

FIG.21A

| ACTIVATED DEVICE ID | ACTIVATING DEVICE ID | TRANSMITTING NET | RECEIVING NET |
|---|---|---|---|
| 2200A | 2100A | FIRST | FIRST |
| 2200A | 2100B | SECOND | FIRST |
| 2200B | 2100A | SECOND | SECOND |
| ... | ... | ... | ... |

ENTRY 2101
ENTRY 2102
ENTRY 2103

| ACTIVATED DEVICE ID | ACTIVATING DEVICE ID | TRANSMITTING NET | RECEIVING NET | RECEPTION PROBABILITY |
|---|---|---|---|---|
| 2200A | 2100A | FIRST | FIRST | P0301 |
| 2200A | 2100B | SECOND | FIRST | P0302 |
| 2200A | 2100C | FIRST | FIRST | P0303 |
| 2200B | 2100A | SECOND | FIRST | P0401 |
| 2200B | 2100B | FIRST | FIRST | P0402 |
| 2200B | 2100C | FIRST | FIRST | P0403 |
| ... | ... | ... | ... | ... |

| ACTIVATED DEVICE ID | ACTIVATING DEVICE ID | TRANSMITTING NET | RECEIVING NET |
|---|---|---|---|
| 2200 | 2100A | FIRST | FIRST |
| 2200 | 2100B | SECOND | SECOND |
| 2200 | 2100C | SECOND | FIRST |
| 2200 | 2100D | SECOND | SECOND |
| ... | ... | ... | ... |

REMOTE ACTIVATING DEVICE

CROSS-REFERENCE TO RELATED APPLICATIONS

This application is based upon and claims the benefit of priority from Japanese Patent Application 2010-220217 filed on Sep. 30, 2010, the entire contents of which are incorporated herein by reference.

FIELD

Embodiments described herein relate generally to a remote activating device.

BACKGROUND

A system that executes remote activation is a system in which a remote activating device transmits an activation signal to a device to be activated, and the device that receives the activation signal activates itself. For example, a user of a personal computer (PC) can activate a printer at a remote position by transmitting the activation signal from the PC to the printer.

As the system that executes remote activation, a system has been known in which a remove activating device and a device to be activated are provided with dedicated communication interfaces for performing transmission and reception of an activation signal.

For example, the remote activating device and the device to be activated include a high-speed, high-power consumption communication interface and a low-speed, low-power consumption communication interface. The high-speed, high-power consumption interface is used for data communication, and the low-speed, low-power consumption interface is used as a communication interface only for an activation signal use (see Japanese Patent Application Laid-Open No. JP2009-129242). According to the system, the communication interface dedicated for the activation signal use is provided. Accordingly, while the activation signal is awaited, the device to be remotely activated can activate the low-speed, low-power consumption communication interface used only for activation signal and suspend the high-speed, high-power consumption data communication interface. As a result, power consumption can be reduced.

However, the interfaces may be different in communication coverage or communication quality (for example, a radio wave interference resistance level) when a plurality of communication interfaces having such different characteristics are used as described. Thus, it is difficult to perform remote activation in the system in which the activation signal dedicated interface is provided as in the prior art, since there may be a case where communication can not be performed via the activation signal dedicated interface although communication can be performed via the other interface.

According to a remote activating device and a remotely started device of the present invention, remote activation can be reliably executed at low power consumption.

BRIEF DESCRIPTION OF THE DRAWINGS

FIG. 1A is a block diagram illustrating a configuration of a remote activating device, and FIG. 1B is a block diagram illustrating a configuration of a device to be activated.

FIGS. 4A to 4C are diagrams illustrating examples of information stored in a storage unit 207 of the device to be activated of FIGS. 1A and 1B.

FIGS. 5A and 5B are diagrams illustrating examples of information stored in a storage unit 108 of the remote activating device of FIGS. 1A and 1B.

FIG. 6A illustrates an example of information stored in the storage unit 108, and FIG. 6B illustrates an example of information stored in the storage unit 207.

FIG. 9A is a block diagram illustrating a configuration of a remote activating device 100, and FIG. 1B is a block diagram illustrating a configuration of a device to be activated 200.

FIGS. 11A and 11B illustrate examples of information stored in a storage unit 108 of the remote activating device 100 and a storage unit 207 of the device to be activated 200.

FIGS. 13A to 13D are diagrams illustrating examples of information stored in a storage unit 207 of a device to be activated 200 according to a second embodiment.

FIG. 20 is a diagram illustrating an example of activation information database stored in a storage unit 207 of the device to be activated according to the fourth embodiment.

FIGS. 21A and 21B are diagrams illustrating examples of activation information database stored in a storage unit 108 of the remote activating device according to the fourth embodiment.

FIG. 26 is a diagram illustrating an example of activation signal information database stored in a storage unit 108 of a remote activating device according to a sixth embodiment of the present invention.

DETAILED DESCRIPTION

A remote activating device according to an embodiment of the present invention is a remote activating device that remotely activates devices to be activated connected to a first network and a second network. The remote activating device includes a first interface connected to the first network, a second interface connected to the second network, an arrival confirmation processing unit that transmits an arrival attribute confirmation signal to the device to be activated using the first interface and confirms whether or not the arrival attribute confirmation signal has arrived at the device to be activated, a judging unit that decides the first interface as an activation signal transmitting interface for transmitting an activation signal for remotely activating the device to be activated when the arrival attribute confirmation signal has arrived at the device to be activated and decides the second interface as the activation signal transmitting interface when the arrival attribute confirmation signal has not arrived at the device to be activated, and an activating unit that transmits the activation signal using the activation signal transmitting interface decided by the judging unit.

Hereinafter, exemplary embodiments of the present invention will be described with reference to the accompanying drawings.

<First Embodiment>

Figure 1A:
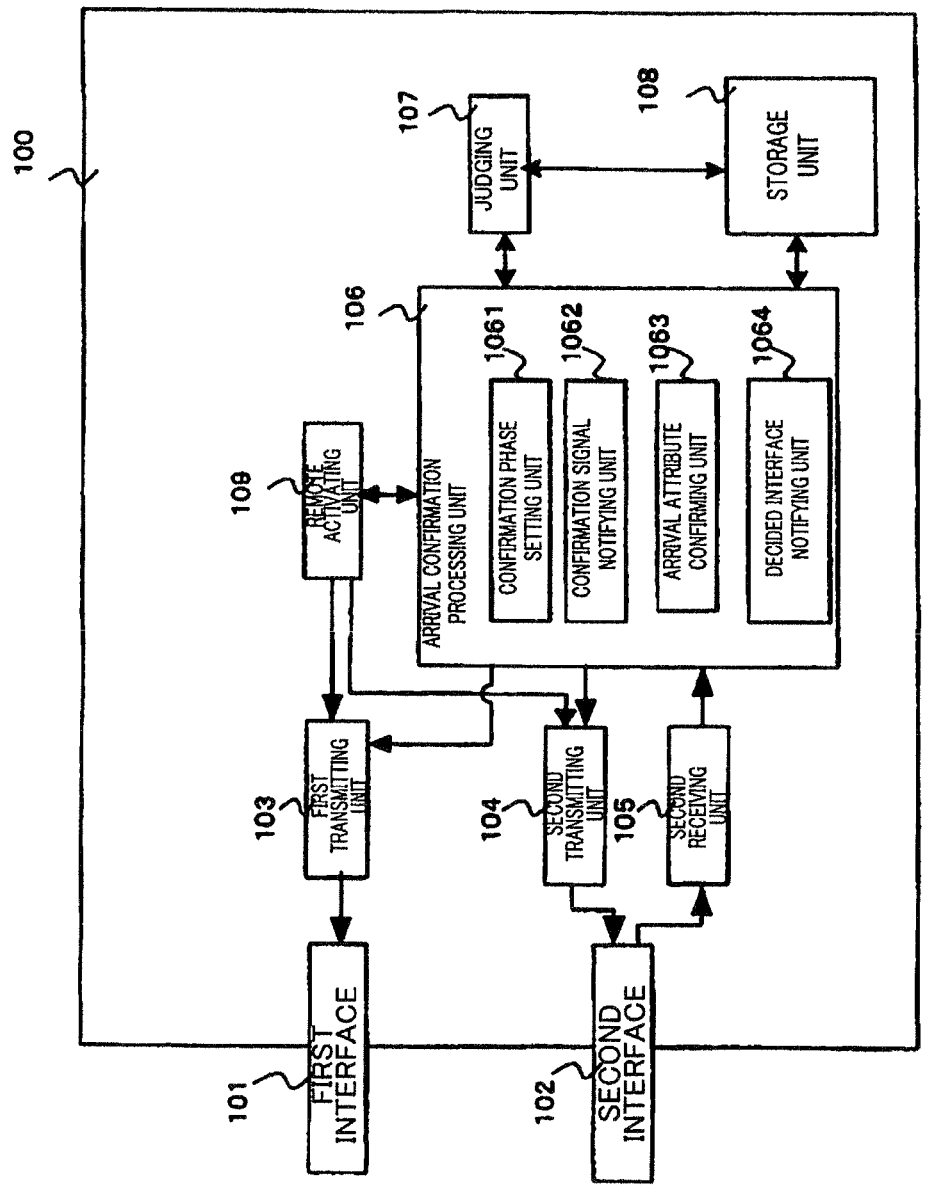
FIGS. 1A and 1B are diagrams illustrating a configuration of an overall remote activating system according to a first embodiment.
Figure 1B:
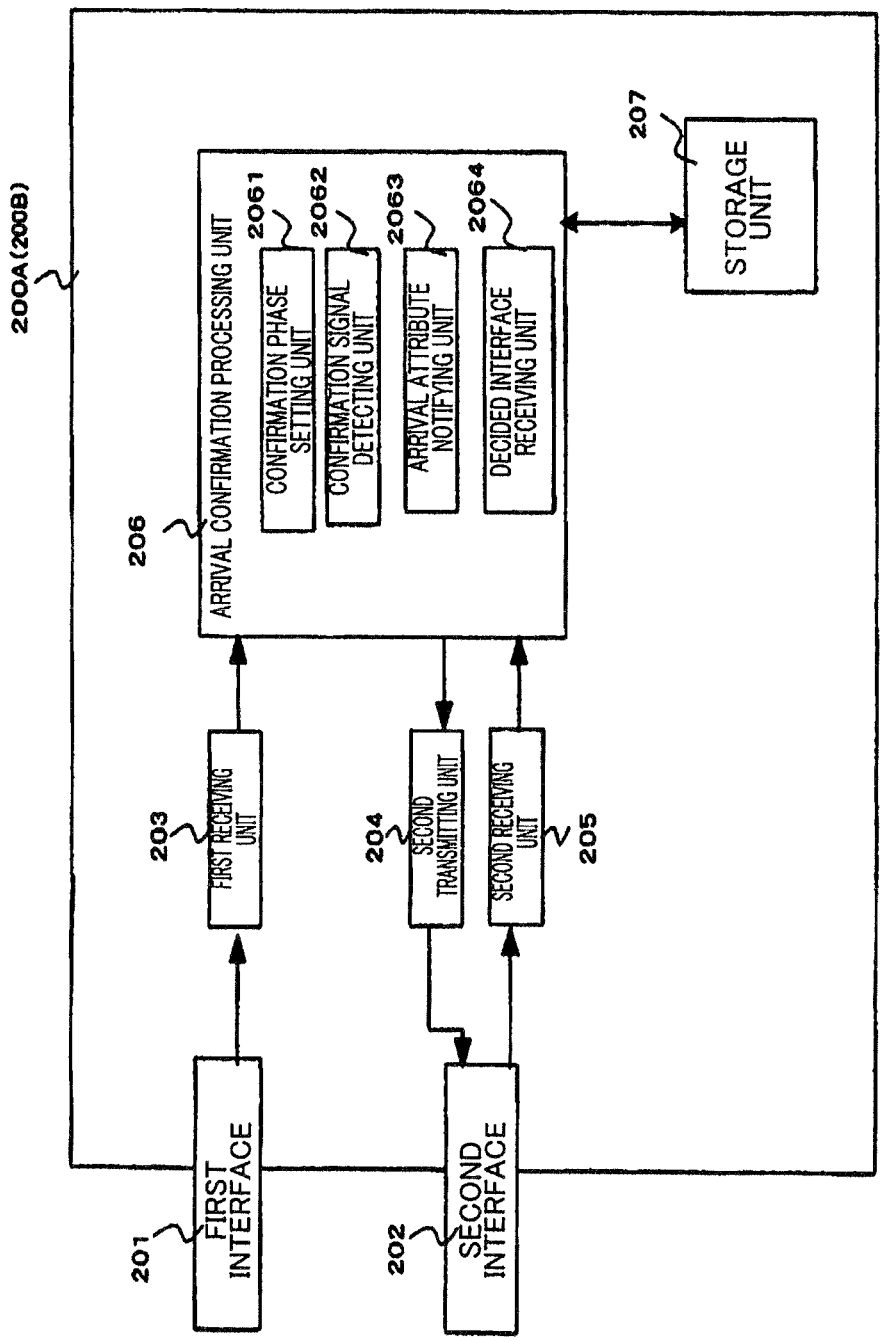

FIG. 1A is a block diagram illustrating a configuration of a remote activating device 100 according to a first embodiment of the present invention. FIG. 1B is a block diagram illustrating a configuration of a device to be activated 200 according to the first embodiment of the present invention.

The remote activating device 100 of FIG. 1A includes a first interface 101 connected to a first network and a second interface 102 connected to a second network and having a communication coverage larger than the first interface 101. A first transmitting unit 103 performing a transmitting process is connected to the first interface 101. A second transmitting unit 104 performing a transmitting process and a second receiving unit 105 performing a receiving process are connected to the second interface 102. The remote activating device 100 further includes an arrival confirmation processing unit 106, a judging unit 107, a storage unit 108, and a remote activating unit 109. The arrival confirmation processing unit 106 transmits an arrival attribute confirmation signal to the device to be activated 200 through the first transmitting unit 103 and the first interface 101 and checks whether or not the arrival attribute confirmation signal has arrived at the device to be activated 200. When the arrival attribute confirmation signal has arrived at the device to be activated 200, the judging unit 107 decides the first interface 101 as an activation signal transmitting interface for transmitting an activation signal for remotely activating the device to be activated 200. Further, when the arrival attribute confirmation signal has not arrived at the device to be activated 200, the judging unit 107 decides the second interface 102 as the activation signal transmitting interface. The storage unit 108 stores the judgment result of the judging unit 107 and information specifying the decided activation signal transmitting interface. The remote activating unit 109 transmits the activation signal through the activation signal transmitting interface. Hereinafter, whether or not the arrival attribute confirmation signal has arrived at the device to be activated 200 is referred to as "arrival attribute", and a process of confirming arrival attribute is referred to as "arrival attribute confirming process".

The arrival confirmation processing unit 106 includes a confirmation phase setting unit 1061, a confirmation signal notifying unit 1062, an arrival attribute confirming unit 1063, and a decided interface notifying unit 1064. The confirmation phase setting unit 1061 sets an activation signal arrival attribute confirmation phase for executing the arrival attribute confirming process together with the device to be activated 200 through the second interface 102. The confirmation signal notifying unit 1062 transmits an arrival attribute confirmation signal to the device to be activated 200 through the first interface 101. The arrival attribute confirming unit 1063 confirms an arrival attribute of the arrival attribute confirmation signal through the second interface 102. The decided interface notifying unit 1064 notifies the device to be activated 200 of information specifying a network connected to the activation signal transmitting interface through the second interface 102.

FIG. 1B is a block diagram illustrating a configuration of the device to be activated 200 according to the first embodiment of the present invention.

A device to be activated 200A includes a first interface 201 connected to the first network and a second interface 202 connected to the second network and having a communication coverage larger than the first interface 201. A first receiving unit 203 performing a receiving process is connected to the first interface 201. A second transmitting unit 204 performing a transmitting process and a second receiving unit 205 performing a receiving process are connected to the second interface 202. The device to be activated 200A further includes an arrival confirmation processing unit 206 that detects whether or not the arrival attribute confirmation signal has been received from the remote activating device 100 through the first interface 201 and the first receiving unit 203 (the arrival attribute). The device to be activated 200A further includes a storage unit 207 that stores information specifying an activation signal receiving interface awaiting the activation signal and information of the received arrival attribute confirmation signal.

The arrival confirmation processing unit 206 includes a confirmation phase setting unit 2061, a confirmation signal detecting unit 2062, an arrival attribute notifying unit 2063, and a decided interface receiving unit 2064. The confirmation phase setting unit 2061 sets the confirmation phase together with the remote activating device 100 through the second interface 202. The confirmation signal detecting unit 2062 detects whether or not the arrival attribute confirmation signal can be received through the first interface 201 (the arrival attribute). The arrival attribute notifying unit 2063 notifies the remote activating device 100 of the arrival attribute of the arrival attribute confirmation signal through the second interface 202. The decided interface receiving unit 2064 receives information specifying a network connected to the activation signal transmitting interface.

A combination of the first network and the second network includes, for example, a combination of Bluetooth and IEEE 802.11, a combination of ZigBee and IEEE 802.11, a combination of certain power saving wireless and IEEE 802.3, and the like.

Figure 2:
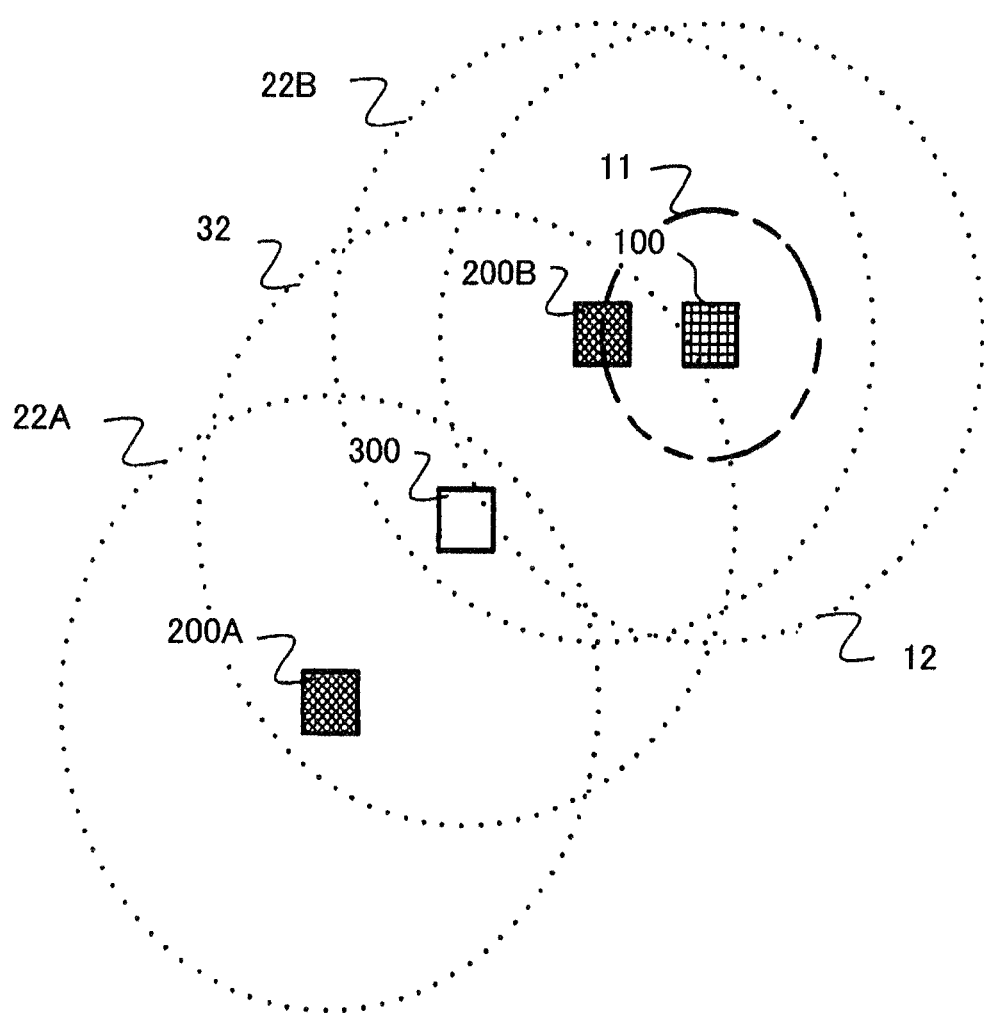
FIG. 2 is a diagram illustrating a network in which remote activation is performed using the remote activation system according to the first embodiment of the present invention.

Next, a remote activation system according to the first embodiment of the present invention will be described. FIG. 2 is a diagram illustrating a network in which remote activation is performed using the remote activation system according to the first embodiment of the present invention. The remote activation system of FIG. 1 includes one remote activating device 100, two devices to be activated 200A and 200B, and an access point 300. The devices to be activated 200A and 200B have the same configuration and function as the device to be activated 200.

In FIG. 2, the remote activating device 100 can communicate with the device to be activated 200B through any one of the first network and the second network. However, the remote activating device 100 can communicate with the device to be activated 200A through the second network but can not communicate with it through the first network. This point will be described below in detail.

An arrival range of a signal transmitted from the remote activating device 100 through the first network is represented by a two-dot chain line 11. An arrival range of a signal transmitted from the remote activating device 100 through the second network is represented by a dashed line 12. An arrival range of a signal transmitted from the device to be activated 200A through the second network is represented by a dashed line 22A, and an arrival range of a signal transmitted from the device to be activated 200B through the second network is represented by a dashed line 22B.

An arrival range of a signal transmitted from the access point 300 through the second network is represented by a dashed line 32.

As can be seen from the signal arrival range 11 of FIG. 2, a signal transmitted from the remote activating device 100 arrives at the device to be activated 200B through the first network. As can be seen from the signal arrival range 12 of FIG. 2, a signal transmitted from the remote activating device 100 arrives at the device to be activated 200B through the second network. Further, as can be seen from the signal arrival range 22B of FIG. 2, a signal transmitted from the device to be activated 200B arrives at the remote activating device 100 through the second network.

Meanwhile, as can be seen from the signal arrival range 11 of FIG. 2, a signal transmitted from the remote activating device 100 does not arrive at the remote device to be activated 200A through the first network 11. Further, as can be seen from the signal arrival range 12 of FIG. 2, a signal transmitted from the remote activating device 100 arrives at the access point 300 through the second network. Then, as can be seen from the signal arrival range 32 of FIG. 2, a signal arrived at the access point 300 arrives at the remote device to be activated 200A through the second network. Thus, the signal transmitted from the remote activating device 100 arrives at the remote device to be activated 200A through the second network. Further, as can be seen from the signal arrival range 22A of FIG. 2, a signal transmitted from the device to be activated 200A arrives at the access point 300 through the second network. Then, as can be seen from the signal arrival range 32 of FIG. 2, the signal transmitted from the device to be activated 200A arrives at the remote activating device 100 through the access point 300. Thus, the signal transmitted from the device to be activated 200A arrives at the remote activating device 100 through the second network.

Figure 3:
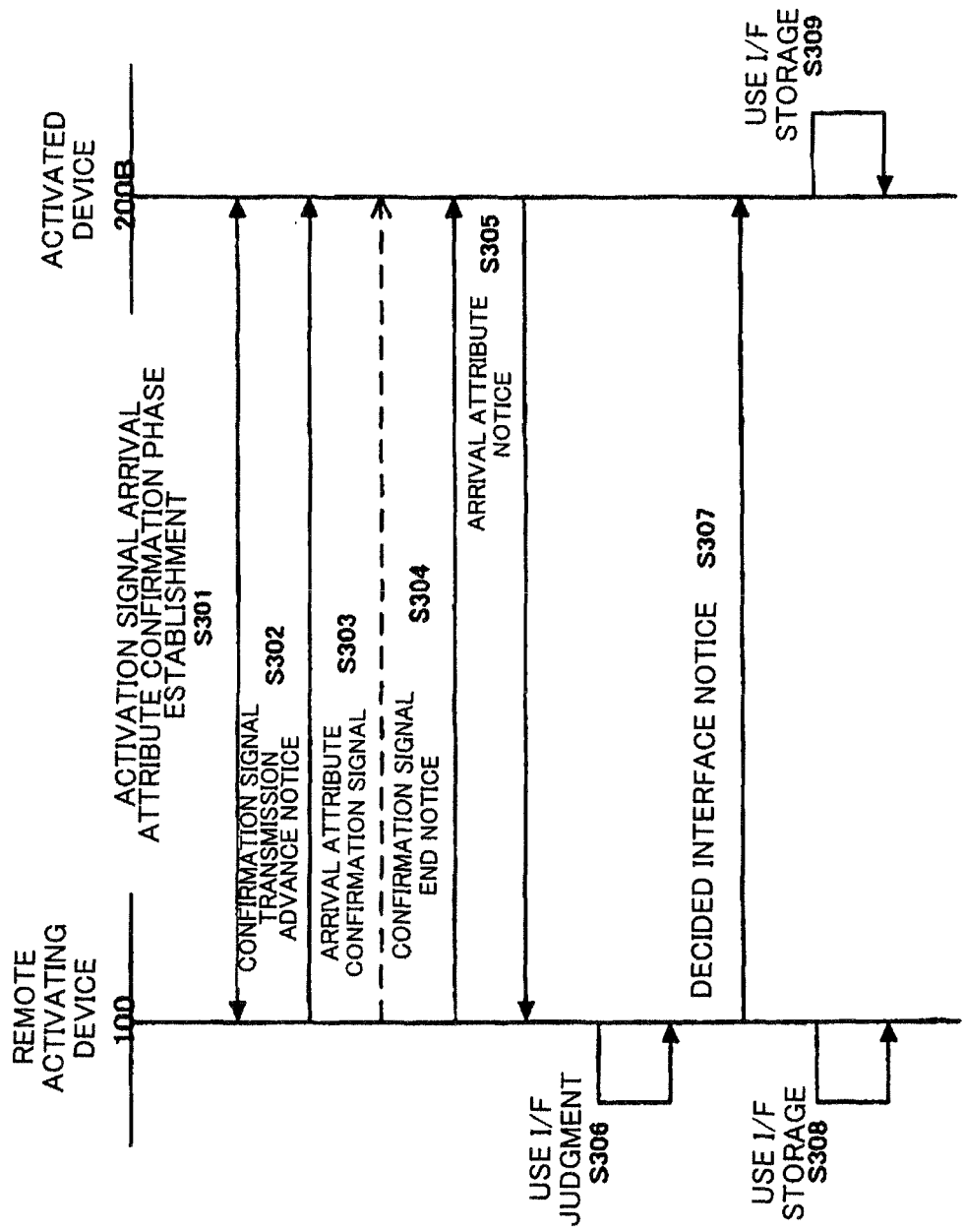
FIG. 3 is a sequence diagram illustrating a process of deciding an activation signal transmitting interface and an activation signal receiving interface between a remote activating device 100 and a device to be activated 200B illustrated in FIG. 2.

Next, a description will be made in detail in connection with a process of deciding the activation signal transmitting interface and the activation signal receiving interface between the remote activating device 100 and the device to be activated 200B in a remote activation system of FIG. 3. FIG. 3 is a sequence diagram illustrating a process of deciding the activation signal transmitting interface and the activation signal receiving interface between the remote activating device 100 and the device to be activated 200B.

First, in step S301, the remote activating device 100 and the device to be activated 200B establish an "activation signal arrival attribute confirmation phase" through the second network that allows mutual communication. For example, the confirmation phase setting unit 2061 of the device to be activated 200B transmits a confirmation phase establishing request through the second transmitting unit 204 and the second interface 202. Then, the confirmation phase setting unit 1061 of the remote activating device 100 receives the confirmation phase establishing request through the second receiving unit 105 and the second interface 102. When the confirmation phase establishing request is transmitted and received, the "activation signal arrival attribute confirmation phase" is established between the remote activating device 100 and the device to be activated 200B. The process for establishing the activation signal arrival attribute confirmation phase may be started from any one of the device to be activated 200B and the remote activating device 100. Further, the activation signal arrival attribute confirmation phase is established at timing such as when the device to be activated 200B is connected to the network or when the device to be activated 200B transitions to a sleep state. Further, the remote activating device 100 may periodically detect the device to be activated 200B connected to the network so as to establish the activation signal arrival attribute confirmation phase.

When the activation signal arrival attribute confirmation phase is established between the remote activating device 100 and the device to be activated 200B, in step S302, the confirmation phase setting unit 1061 of the remote activating device 100 transmits a confirmation signal transmission advance notice to the device to be activated 200B through the second transmitting unit 104 and the second interface 102. For example, the confirmation signal transmission advance notice is information specifying the arrival attribute confirmation signal transmitted from the remote activating device 100. For example, the information specifying the arrival attribute confirmation signal includes a length or a bit pattern of the arrival attribute confirmation signal. The confirmation signal transmission advance notice may further include the number of transmission times of the arrival attribute confirmation signal or a test time in addition to the information specifying the arrival attribute confirmation signal. However, when there is no choice for the configuration of the arrival attribute confirmation signal, for example, when a message format of the arrival attribute confirmation signal is fixed to one format at the time of design, the confirmation signal transmission advance notice may be used to notify only the start of transmission of the arrival attribute confirmation signal.

The confirmation phase setting unit 2061 of the device to be activated 200B receives the confirmation signal transmission advance notice through the second interface 202 and the second receiving unit 205. When the confirmation signal transmission advance notice is received, the confirmation phase setting unit 2061 of the device to be activated 200B notifies the confirmation signal detecting unit 2062 of the presence of the confirmation signal transmission advance notice. Further, when the confirmation signal transmission advance notice includes information specifying the arrival attribute confirmation signal, the confirmation phase setting unit 2061 notifies the confirmation signal detecting unit 2062 of the information. When the notice representing the presence of the confirmation signal advance notice is received, the confirmation signal detecting unit 2062 starts to detect the confirmation signal based on the information specifying the arrival attribute confirmation signal. Even though not shown in FIG. 3, the confirmation phase setting unit 2061 of the device to be activated 200B may start to detect reception of the arrival attribute confirmation signal through the confirmation signal detecting unit 2062 and transmit a preparation end notice to the remote activating device 100 through the second interface 202 and the second transmitting unit 204. In this case, the remote activating device 100 starts a process of step S303 after the preparation end notice is received.

Next, in step S303, the confirmation signal notifying unit 1061 of the remote activating device 100 transmits the arrival attribute confirmation signal to the activation start device 200B through the first transmitting unit 103 and the first interface 101. For example, when the information specifying the confirmation signal is notified by the confirmation signal transmission advance notice, the arrival attribute confirmation signal is a signal that can be specified by the information.

As can be seen from the signal arrival range 11 of FIG. 2, a signal transmitted from the remote activating device 100 through the first interface 101 arrives at the device to be activated 200B through the first network. Thus, the device to be activated 200B can receive the arrival attribute confirmation signal through the first interface 201 and the first receiving unit 203. Then, the confirmation signal detecting unit 2062 detects the arrival attribute confirmation signal. When the arrival attribute confirmation signal is detected, the confirmation signal detecting unit 2062 stores information, which represents whether or not the arrival attribute confirmations signal has been received in the storage unit 207. A characteristic related to the arrival attribute confirmation signal or the communication channel such as signal intensity or a bit error rate of the arrival attribute confirmation signal may be stored together with the information representing whether or not the arrival attribute confirmations signal has been received. FIGS. 4A to 4C illustrate examples of information stored in the storage unit 207. For example, only information representing whether or not the arrival attribute confirmation signal has been received (arrival attribute) may be stored as illustrated in FIG. 4A. In FIG. 4A, when the information could be received, it is indicated by "○", whereas when the information could not be received, it is indicated by "x". The signal intensity of the arrival attribute confirmation signal and the bit error rate of the arrival attribute confirmation signal may be stored together with the information representing whether or not the arrival attribute confirmation signal has been received as illustrated in FIG. 4B. In FIG. 4B, the signal intensity is indicated by "X", and the bit error rate is indicated by "Y". An interface that could not receive or could receive the arrival attribute confirmation signal may be stored together with the information representing whether or not the arrival attribute confirmation signal has been received as illustrated in FIG. 4C. FIG. 4C illustrates an example in which information specifying the first interface 201 is stored.

When transmission of the arrival attribute confirmation signal is finished, in step S304, the confirmation phase setting unit 1061 of the remote activating device 100 transmits a confirmation signal end notice to the device to be activated 200B through the second transmitting unit 104 and the second interface 102. The confirmation signal end notice refers to a signal for expressly notifying transmission completion of the arrival attribute confirmation signal.

The confirmation phase setting unit 2061 of the device to be activated 200 receives the confirmation signal end notice through the second interface 202 and the second receiving unit 205. When the confirmation signal end notice is received, the confirmation phase setting unit 2061 notifies the confirmations signal detecting unit 2062 of reception of the confirmation signal termination notice. The confirmation signal detecting unit 2062 finishes detecting the arrival attribute confirmation signal when it has received the notice that the confirmation signal termination notice is received.

However, the remote activating device 100 may not transmit the confirmation signal termination notice. In this case, the device to be activated 200 recognizes the end of a detection time period of the arrival attribute confirmation signal by another method that does not use the confirmations signal termination notice. For example, the device to be activated 200B may include a timer therein. In this case, after the device to be activated 200 receives the confirmation signal transmission advance notice, the timer may count during a predetermined time period, and when the predetermined time period elapses, the end of the detection time period may be notified to the confirmation signal detecting unit 2062.

When the confirmation signal detecting unit 2062 completes the detection time period of the confirmation signal, in step S305, the arrival attribute notifying unit 2063 of the device to be activated 200 transmits an arrival attribute notice (a reception result of the confirmation signal) to the remote activating device 100 through the second transmitting unit 204 and the second interface 202. The arrival attribute notifying unit 2063 of the confirmation signal may include a characteristic (the signal intensity or the bit error rate of the confirmation signal) related to the confirmation signal or the communication channel in the arrival attribute notice in addition to the reception result of the confirmation signal.

The arrival attribute confirming unit 1063 of the remote activating device 100 receives the arrival attribute notice through the second interface 102 and the second receiving unit 105. The arrival attribute confirming unit 1063 notifies the judging unit 207 of the received arrival attribute notice. Further, the arrival attribute confirming unit 1063 stores the notice content included in the arrival attribute notice in the storage unit 108. FIGS. 5A and 5B illustrate examples of information stored in the storage unit 108. For example, The storage unit 108 stores information specifying the first interface 101 and the result of the arrival attribute of the arrival attribute confirmation signal as illustrated in FIG. 5A. In FIG. 5A, when the arrival attribute confirmation signal has arrived at the device to be activated 200B, it is indicated by ○, whereas when the arrival attribute confirmation signal has not arrived at the device to be activated 200B, it is indicated by x. The storage unit 108 may store the signal intensity of the confirmation signal and the bit error rate of the confirmation signal detected by the device to be activated 200 together with the arrival attribute of the arrival attribute confirmation signal as illustrated in FIG. 5B. In FIG. 5B, the signal intensity is indicated by "X", and the bit error rate is indicated by "Y". Further, the storage unit 108 may store a characteristic related to the confirmation signal or the communication channel in addition to the signal intensity and the bit error rate of the confirmation signal.

In step S306, the judging unit 107 decides the activation signal transmitting interface to be used for remote activation of the device to be activated 200B based on the content of the arrival attribute notice. The judging unit 207 decides the first interface 101 as the activation signal transmitting interface when the arrival attribute confirmation signal has arrived at the device to be activated 200B and decides the second interface 102 as the activation signal transmitting interface when the arrival attribute confirmation signal has not arrived at the device to be activated 200B. In this example, since the arrival attribute confirmation signal has arrived at the device to be activated 200B as described above, the first interface 101 is decided as the activation signal transmitting interface.

Next, in step S307, the decided interface notifying unit 1064 notifies the device to be activated 200B of the decided interface notice through the second transmitting unit 104 and the second interface 102. The decided interface notice includes information specifying the network connected to the decided activation signal transmitting interface. In this example, the decided interface notice includes information specifying the first network. When a plurality of interfaces are connected to the same type of network, in order to identify each of the interfaces, an identifier such as a MAC address and an interface number used for identifying the interface may be notified together with the information specifying the network.

Next, in step S308, the remote activating device 100 stores the information specifying the activation signal transmitting interface (the first interface 101) in the storage unit 108, and in step S309, the device to be activated 200B stores the information specifying the activation signal receiving interface (the first interface 201) in the storage unit 207. FIG. 6A illustrates an example of information stored in the storage unit 108 of the remote activating device 100. The storage unit 108 stores the information specifying the activation signal transmitting interface for remotely activating the device to be activated 200B in association with the identifier (a device to be activated ID) specifying the device to be activated. In the example of FIG. 6A, an ID specifying the device to be activated 200B and information specifying the first interface 101 are stored, and an ID specifying the device to be activated 200A and information specifying the second interface 102 are stored.

FIG. 6B illustrates an example of information stored in the storage unit 207 by the device to be activated 200B. The storage unit 207 stores information specifying a standby interface (the activation signal receiving interface). In the example of FIG. 6B, information specifying the first interface 201 is stored.

Through the above process, it is possible to decide the activation signal transmitting interface and the activation signal receiving interface between the remote activating device 100 and the device to be activated 200B.

Next, a description will be made in connection with an operation in which the remote activating device 100 activates the device to be activated 200B in a state in which the device to be activated 200B is not activated (when the activation signal is awaited) after the activation signal transmitting interface and the activation signal receiving interface are decided between the remote activating device 100 and the device to be activated 200B.

When the activation signal is awaited, the device to be activated 200B operates the activation signal receiving interface (the first interface 201) and suspends the interface (the second interface 202) other than the activation signal receiving interface. When the remote activating device 100 executes remote activation on the device to be activated 200B, the remote activating unit 109 transmits the activation signal to the device to be activated 200B through the first transmitting unit 103 and the activation signal transmitting interface (the first interface 101). The device to be activated 200B receives the activation signal through the first interface 201. The reception of the activation signal causes the device to be activated 200B to be activated. As the device to be activated 200B is activated, power of the second interface 202 is turned on.

The operation of activating the device to be activated 200B has been described above.

Figure 7:
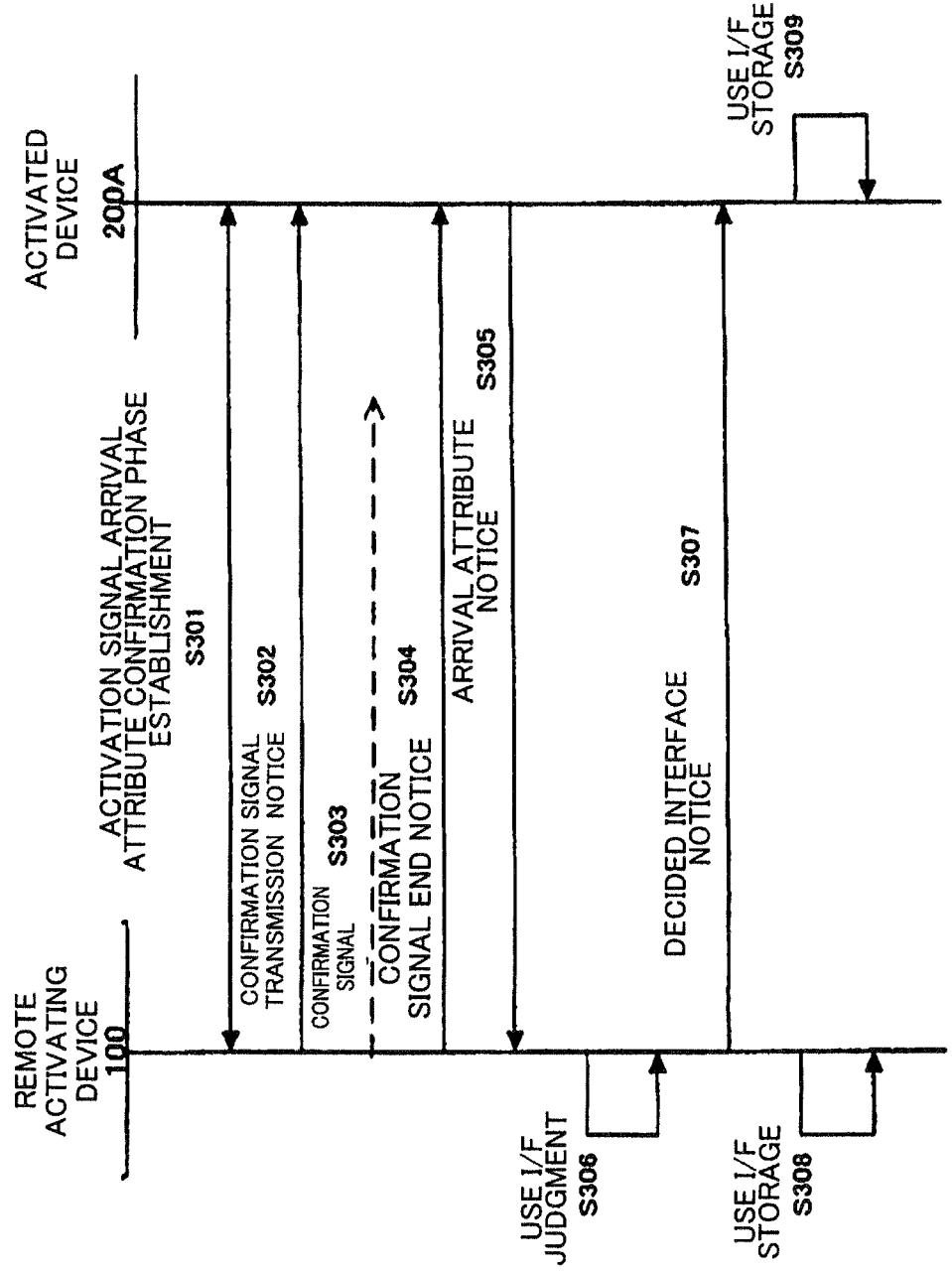
FIG. 7 is a sequence diagram illustrating a process of deciding an activation signal transmitting interface and an activation signal receiving interface between the remote activating device 100 and the device to be activated 200A of FIG. 2.

Next, a description will be made in connection with a process of deciding the activation signal transmitting interface and the activation signal receiving interface between the remote activating device 100 and the device to be activated 200A in the remote activation system of FIG. 2. FIG. 7 is a sequence diagram illustrating a process of deciding the activation signal transmitting interface and the activation signal receiving interface between the remote activating device 100 and the device to be activated 200A. A basic operation is the same as the process between the remote activating device 100 and the remotely device to be activated 200B described with reference to FIG. 3. Thus, the following description will be made focusing on a process different from the process between the remote activating device 100 and the remotely device to be activated 200B.

A signal transmitted from the remote activations device 100 through the first interface 101 does not arrive at the device to be activated 200A through the first network in view of the signal arrival arrange 11 of FIG. 2 and the positional relation between the remote activating device 100 and the device to be activated 200A. Thus, the confirmation signal transmitted from the confirmation signal notifying unit 1061 of the remote activating device 100 to the device to be activated 200A through the first transmitting unit 103 and the first interface 101 in step S303 does not arrive at the device to be activated 200A. Thus, the device to be activated 200A is difficult to receive the arrival attribute confirmation signal through the first interface 201 and the first receiving unit 203.

Figures 8A, 8B:
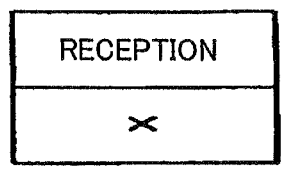
FIGS. 8A and 8B are diagrams illustrating examples of information stored in the storage unit 207 of the device to be activated of FIGS. 1A and 1B.

In step S304, when transmission of the confirmation signal is finished, the confirmation phase setting unit 1061 of the remote activating device 100 transmits the confirmation signal end notice to the device to be activated 200B through the second transmitting unit 104 and the second interface 102. The confirmation phase setting unit 2061 of the device to be activated 200 receives the confirmation signal end notice through the second interface 202 and the second receiving unit 205. When the confirmation signal end notice is received, the confirmation phase setting unit 2061 notifies the confirmation signal detecting unit 2062 of reception of the confirmations signal end notice. When the notice representing reception of the confirmation signal end notice is received, the confirmation signal detecting unit 2062 finishes detecting the arrival attribute confirmation signal. The confirmation signal detecting unit 2062 detects that the confirmation signal could not be received since the confirmation signal could not be received during the detection time period of the confirmation signal. The confirmation signal detecting unit 2062 stores information representing that the confirmation signal could not be received in the storage unit 207. FIGS. 8A and 8B illustrate examples of information stored in the storage unit 207. For example, information (indicated by x) representing that the arrival attribute confirmation signal could not be received may be stored as illustrated in FIG. 8A. Further, the storage unit 207 may store information specifying the first interface 201 together with the information representing that the arrival attribute confirmation signal could not be received as illustrated in FIG. 8B.

In step S305, when the confirmation signal detecting unit 2062 completes the detection time period of the confirmation signal, the arrival attribute notifying unit 2063 of the device to be activated 200A transmits the arrival attribute notice (the reception result of the arrival attribute confirmation signal) to the remote activating device 100 via the second transmitting unit 204 and the second interface 202.

In step S306, the judging unit 107 of the remote activating device decides the activation signal transmitting interface to be used for remote activation of the device to be activated 200A based on the content of the arrival attribute notice. The judging unit 107 decides the second interface 102 as the activation signal transmitting interface when the arrival attribute confirmation signal has not arrived at the device to be activated 200A. In this example, since the arrival attribute confirmation signal has not arrived at the device to be activated 200A, the second interface 202 is decided as the activation signal transmitting interface.

Next, in step S307, the decided interface notifying unit 1064 transmits, to the device to be activated 200A, a decided interface notice including information specifying the second network connected to the decided activation signal transmitting interface (the second interface 102) via the second transmitting unit 104 and the second interface 102.

Next, in step S308, the remote activating device 100 stores an ID specifying the device to be activated 200A and the information specifying the second interface 102 in the storage unit 108, and in step S309, the device to be activated 200B stores information specifying the second interface 202 in the storage unit 207.

Through the above process, it is possible to decide the activation signal transmitting interface and the activation signal receiving interface between the remote activating device 100 and the device to be activated 200A.

An operation in which the remote activating device 100 activates the device to be activated 200A after the activation signal transmitting interface and the activation signal receiving interface are decided between the remote activating device 100 and the device to be activated 200A is similar to the above described process between the remote activating device 100 and the device to be activated 200B, and thus a redundant description thereof will not be repeated. In the process between the remote activating device 100 and the device to be activated 200B, the first interface 101 is described as the activation signal transmitting interface, and the first interface 102 is described as the activation signal receiving interface. However, in the process between the remote activating device 100 and the device to be activated 200A, the second interface 102 is used as the activation signal transmitting interface, and the second interface 202 is used as the activation signal receiving interface.

According to the system of the remote activating device 100 and the remotely device to be activated 200A and 200B of the present embodiment, the arrival attribute of the arrival attribute confirmation signal is confirmed by the first interface having the smaller communication coverage than the second interface in advance. The first interfaces having low power consumption are used as the activation signal transmitting interface and the activation signal receiving interface when the arrival attribute confirmation signal has arrived. The second interfaces are used as the activation signal transmitting interface and the activation signal receiving interface when the arrival attribute confirmation signal has not arrived. Since it is confirmed in advance whether or not communication can be performed between the interfaces, the remote activation can be reliably performed at low power consumption.

For example, the remote activation device 100 can be implemented using a general-purpose computer device as basic hardware. That is, the first interface 101, the second interface 102, the first transmitting unit 103, the second transmitting unit 104, the second receiving unit 105, the arrival confirmation processing unit 106, the judging unit 107, the storage unit 108, and the remote activating unit 109 may be implemented by executing a program through a processor mounted in the computer device. At this time, the remote activating device 100 may be implemented by installing the program in the computer device in advance. Further, the remote activating device 100 may be implemented by storing the program in a storage medium such as a compact-disc-read only memory (CD-ROM) or distributing the program via a network and appropriately installing the program in the computer device. The storage device 108 may be implemented by appropriately using a memory built in or externally attached to the computer device, a hard disk, or a storage medium such as a compact disc-recordable (CD-R), a compact disc-rewritable (CD-RW), a digital versatile disc read only memory (DVD-RAM), and a digital versatile disc recordable (DVD-R).

In the present embodiment, the remote activating device 100 does not include a first receiving unit for performing a reception process via the first interface, and the device to be activated 200A and 200B do not include a first transmitting unit for performing a transmission process via the first interface. However, the remote activate device 100 may include the first receiving unit, and the device to be activated 200A and 200B may include the first transmitting unit.

In the present embodiment, the second interface 102 of the remote activating device 100 and the second interface 202 of the device to be activated 200 have the communication coverage larger than the first interface 101 and the first interface 201, respectively. However, the second interface needs not necessarily have the communication coverage larger than the first interface. That is, it is preferable that the second interface performs more stable communication than the first interface.

In the present embodiment, when the arrival attribute confirmation signal from the remote activating device 100 has arrived at the device to be activated 200B, the first interfaces are used as the activation signal transmitting interface and the standby interface. However, even when the arrival attribute confirmation signal has arrived, either of the first interfaces and the second interfaces may be selected as the activation signal transmitting interface and the standby interface. For example, the second interfaces may be selected when the second interface has the lower power consumption than the first interface.

Further, in the present embodiment, the remote activating device 100 and the device to be activated 200B include two types of interfaces, but the remote activating device 100 and the device to be activated 200B may include three or more types of interfaces. A modified embodiment 1 will be described below with reference to FIG. 9.

<Modified Embodiment 1>

Figure 9A:
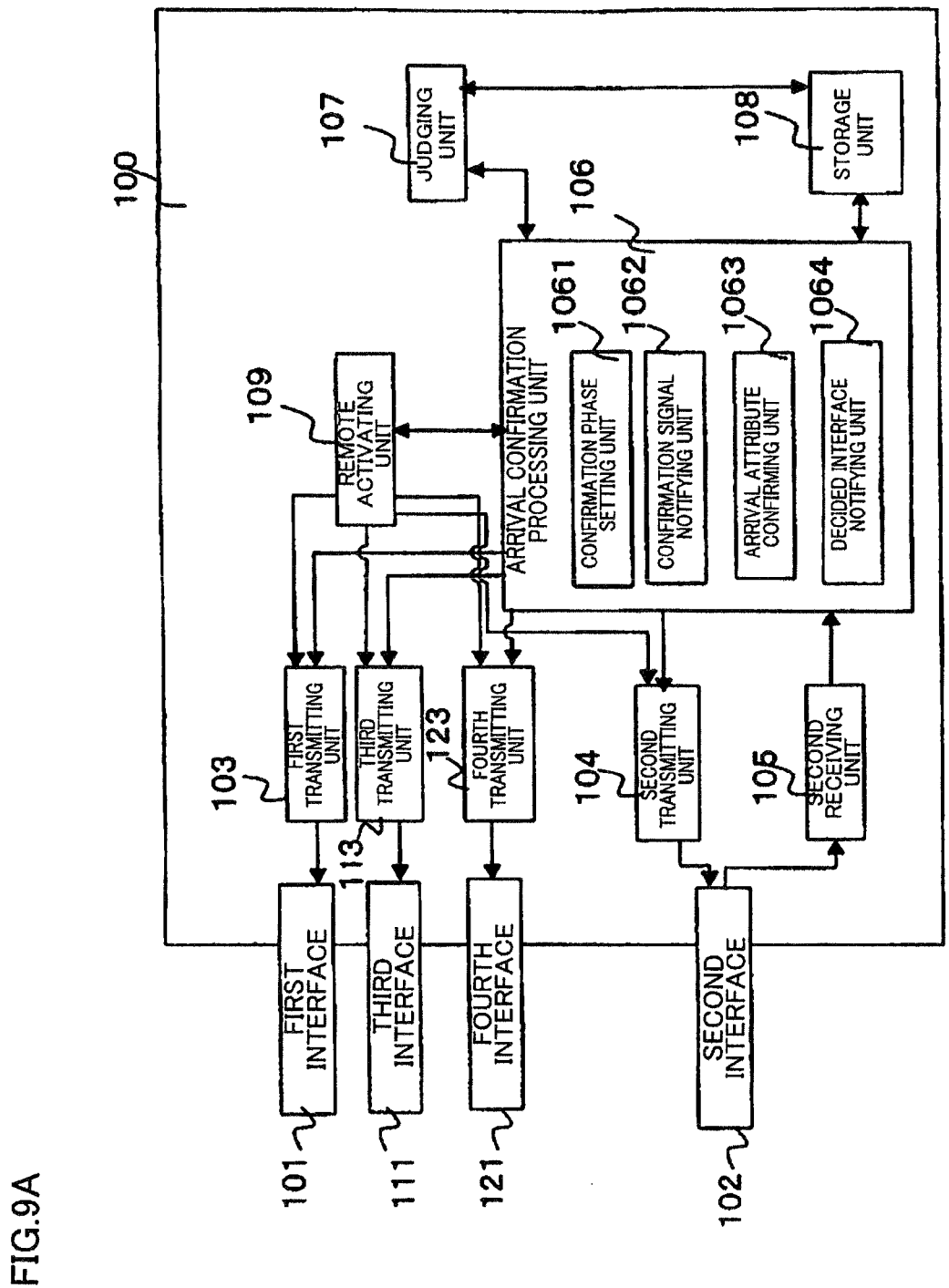
FIGS. 9A and 9B are diagrams illustrating a configuration of an overall remote activating system according to a modified example of the first embodiment.
Figure 9B:
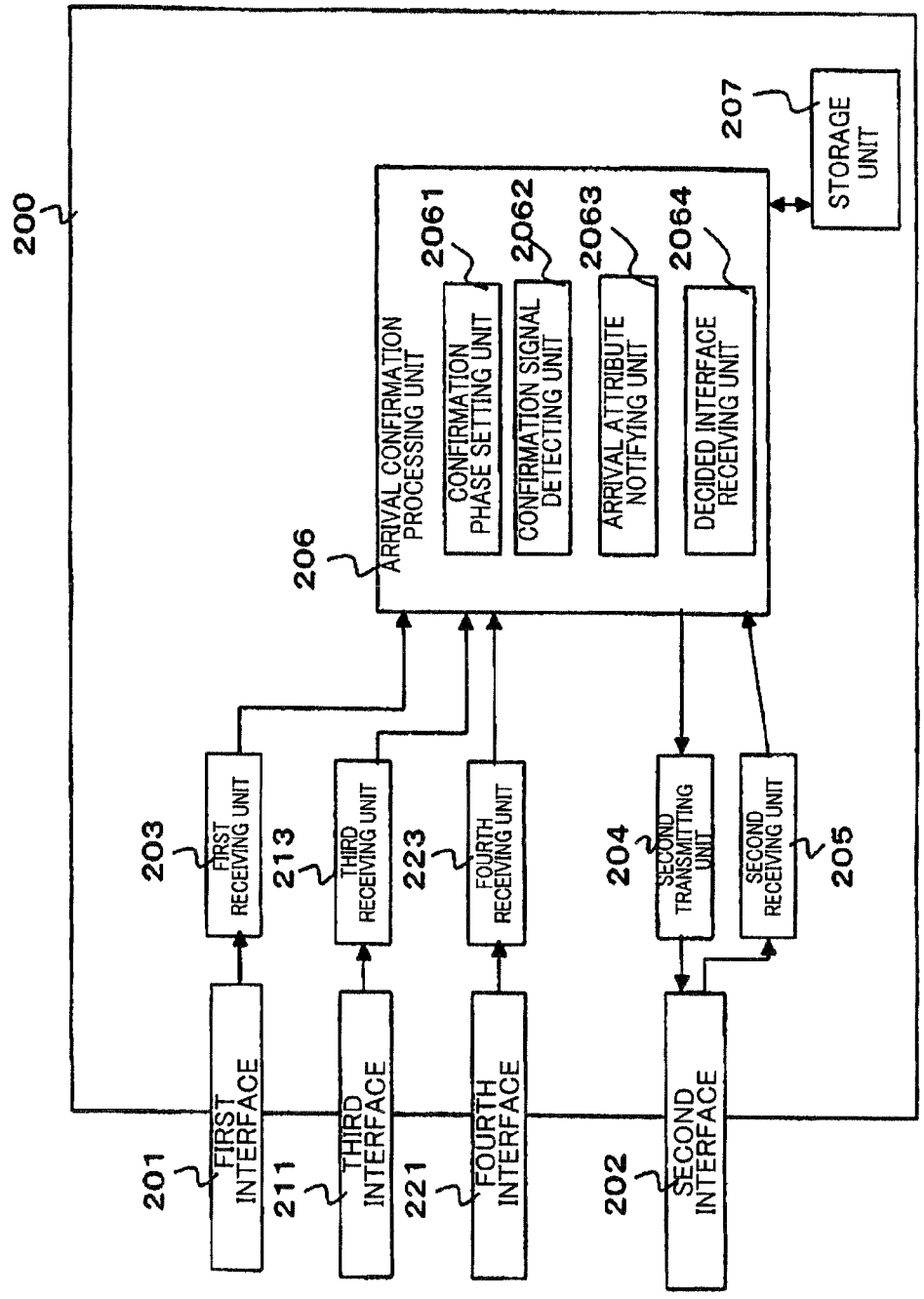

FIGS. 9A and 9B illustrate an example in which the remote activating device 100 and the device to be activated 200 include four interfaces, respectively. The remote activating device 100 further includes a third interface 111, a fourth interface 121, a third transmitting unit 113, and a fourth transmitting 123. The device to be activated 200 further includes a third interface 211, a fourth interface 221, a third receiving unit 213, and a fourth receiving unit 223.

Figure 10:
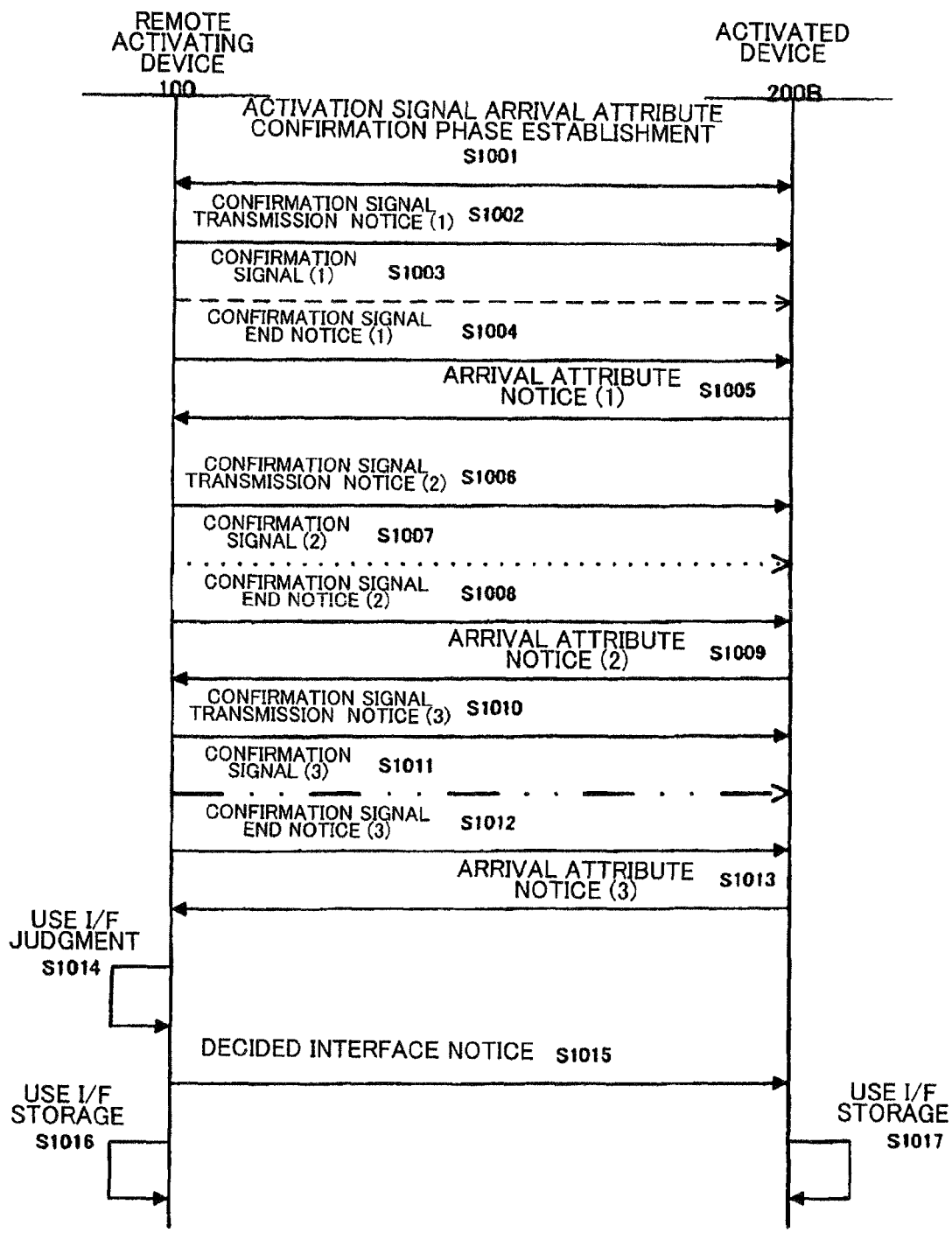
FIG. 10 is a sequence diagram illustrating a process of deciding an activation signal transmitting interface and an activation signal receiving interface between the remote activating device 100 and the device to be activated 200 in the remote activating system illustrated in FIGS. 9A and 9B.

FIG. 10 is a sequence diagram for explaining a process of deciding the activation signal transmitting interface and the activation signal receiving interface between the remote activating device 100 and the device to be activated 200.

First, in step S1001 to step S1013, the activation signal arrival attribute confirmation phase is established similarly to step S301, and then the same processes as step S302 (the confirmation signal transmission advance notice), step S303 (transmission of the arrival attribute confirmation signal), step S304 (the confirmation signal end notice), and step S305 (the arrival attribute notice) are performed on each of the first interface 101, the third interface 111, and the fourth interface 121.

FIGS. 11A and 11B illustrate examples of information, which represents whether or not the arrival attribute confirmation signal has been received, stored in the storage unit 108 of the remote activating device 100 and the storage unit 207 of the device to be activated 200 after arrival attribute confirmation of each of the first, third, and fourth interfaces. The examples of FIGS. 11A and 11B represent that the device to be activated 200 could receive the arrival attribute confirmation signal through the first and third interfaces and could not receive the arrival attribute confirmation signal through the fourth interface.

When the arrival attribute confirmation process is executed on a plurality of interfaces and then the arrival attribute confirmation signal could be received through the plurality of interfaces, in step S1014, the judging unit 107 specifies one activation signal transmitting interface used for remote activation based on an additional judgment criterion other than a judgment method based on whether or not the arrival attribute confirmation signal has been received. For example, random selection, an order of an interface identifier, or an ascending order of energy expended when the activation signal is awaited or transmitted are conceivable as the judgment criterion. As for the consumption energy, a value calculated at the time of design may be stored in the storage unit 108, and the arrival attribute notice including information of consumption energy as additional information may be returned. Further, the information may be collected independently of the procedure of the present embodiment. For example, when the device to be activated 200 could receive the arrival attribute confirmation signal through the first and third interfaces as in the example of FIGS. 11A and 11B, the judging unit 107 selects an interface having low standby power consumption from the first and third interfaces. However, when the device to be activated 200 could not receive the arrival attribute confirmation signal through any of the first, third, and fourth interfaces, the judging unit 107 selects the second interface 102 as the activation signal transmitting interface.

In the above example, the second interface 102 is selected as the activation signal transmitting interface when any of the first, third, and fourth interfaces could not receive the arrival attribute confirmation signal. However, the second interface may be selected as the activation signal transmitting interface even when any of the first, third, and fourth interfaces could receive the arrival attribute confirmation signal. For example, it is the case in which the judging unit 107 has compared all of the first, third, and fourth interfaces that could receive the arrival attribute confirmation signal with the second interface and has judged that the second interface has smallest standby power consumption.

Further, in the present embodiment, the judging unit 107 selects one activation signal transmitting interface, but the judging unit 107 may judge that a plurality of interfaces are to be used when standby energy consumption by a plurality of interfaces is allowable in the device to be activated 200.

Figure 12:
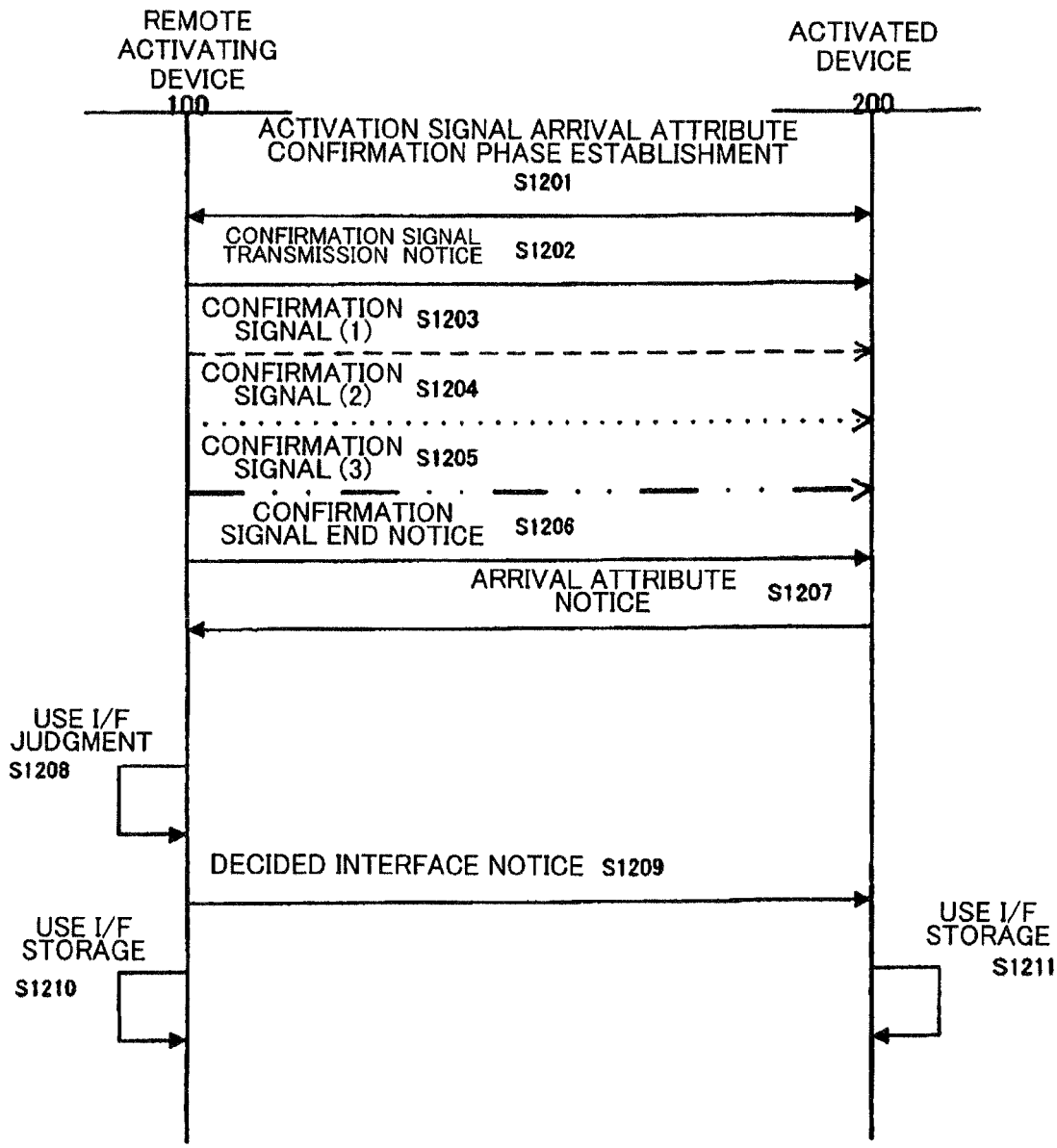
FIG. 12 is a sequence diagram illustrating a second example of a process of deciding an activation signal transmitting interface and an activation signal receiving interface between the remote activating device 100 and the device to be activated 200.

In the modified embodiment 1, the process of deciding the activation signal transmitting interface and the activation signal receiving interface between the remote activating device 100 and the device to be activated 200 may be performed by the sequence of FIG. 12 instead of the sequence illustrated in FIG. 10. FIG. 12 is a sequence diagram illustrating a second example of the process of deciding the activation signal transmitting interface and the activation signal receiving interface between the remote activating device 100 and the device to be activated 200 according to the modified embodiment 1. In an example of FIG. 12, in step S1201, the signal arrival attribute confirmation phase is established by the same process as in step S301. Then, in step S1202, confirmation orders of the first interface 101, the third interface 111, and the fourth interface 121 are notified through the confirmation signal transmission advance notice. The arrival attribute confirmation signals are transmitted in the notified order. For example, in step S1203 subsequent to step S1202, the arrival attribute confirmation signal is notified using the first interface 101, in step S1204, the arrival attribute confirmation signal is notified using the third interface 111, and in step S1205, the arrival attribute confirmation signal is notified using the fourth interface 121. Thereafter, in step S1206, the remote activating device 100 notifies the confirmation signal end notice. In step S1207, the remote activating device 100 receives the arrival attribute notice on each of the first interface 101, the third interface 111, and the fourth interface 121 from the device to be activated 200. Thereafter, processes of from steps S1208 to S1211 are the same as the processes of from steps S1014 to S1017, and thus a redundant description thereof will not be repeated.

The modified embodiment 1 has been described in connection with the example using the four interfaces. However, even when five or more interfaces are used, a similar process may be performed to decide the activation signal transmitting interface and the activation signal receiving interface.

<Second Embodiment>

Next, a remote activating device 100 according to a second embodiment of the present invention will be described. Configurations of the remote activating device 100 and a device to be activated 200 according to the second embodiment are the same as the configurations of the remote activating device 100 and the device to be activated 200 of FIG. 1, respectively, and thus the configurations will be described with reference to FIG. 1.

The remote activating device 100 according to the second embodiment of the present invention is different from the remote activating device according to the first embodiment in that the arrival attribute confirmation signal is transmitted multiple times, and the activation signal transmitting interface is decided according to the number of reception times of the arrival attribute confirmation signal of the device to be activated.

Figure 14:
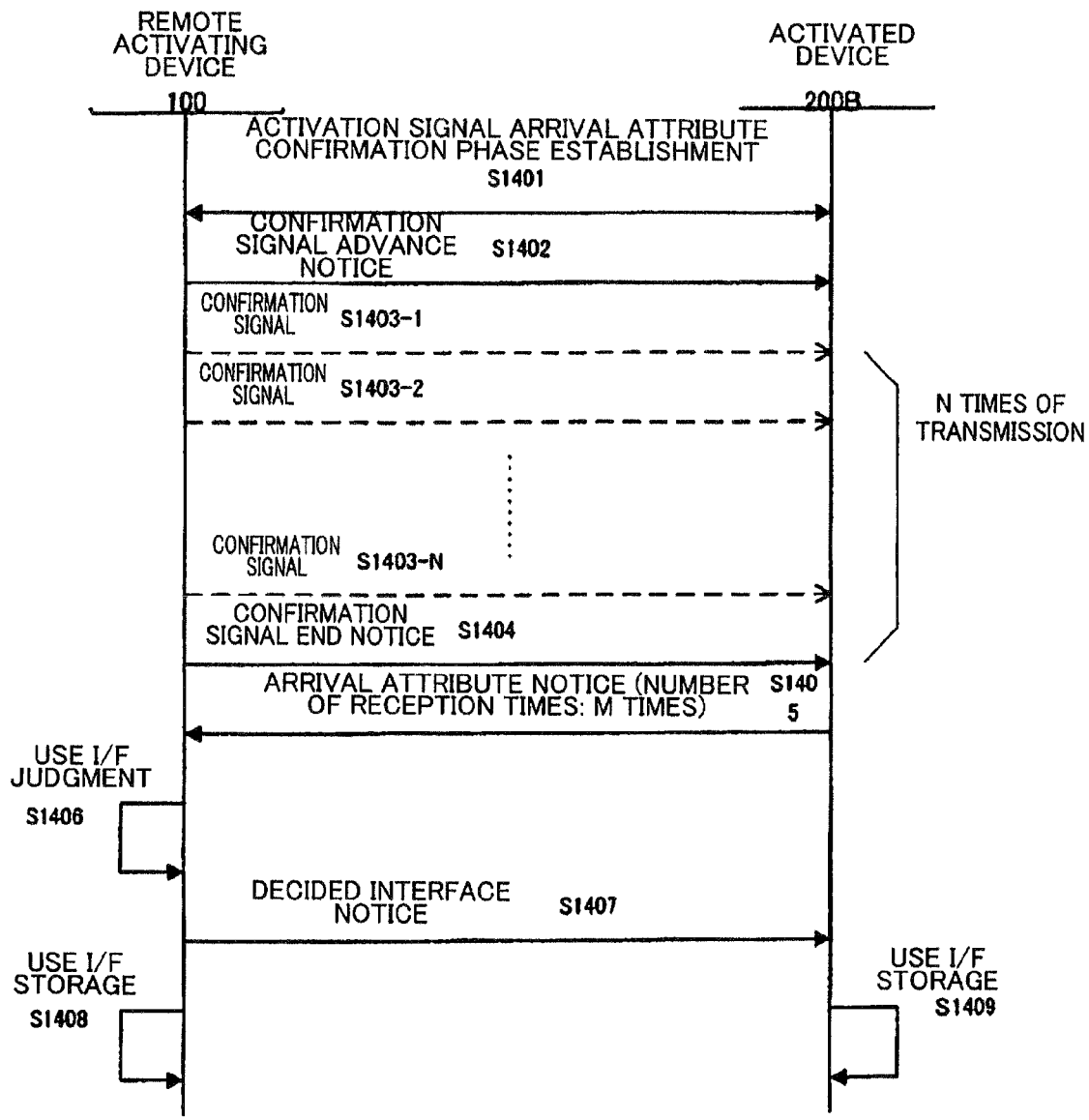
FIG. 14 is a sequence diagram illustrating a process of deciding an activation signal transmitting interface and an activation signal receiving interface between a remote activating device 100 and a device to be activated 200 according to the second embodiment and a third embodiment of the present invention.

Next, a detailed description will be made in connection with a process of deciding the activation signal transmitting interface and the activation signal receiving interface between the remote activating device 100 and the device to be activated 200. FIG. 14 is a sequence diagram illustrating the process of deciding the activation signal transmitting interface and the activation signal receiving interface between the remote activating device 100 and the device to be activated 200B.

A process of establishing the activation signal arrival attribute confirmation phase of step S1401 is the same process as step S301 described with reference to FIG. 3. The confirmation signal transmission advance notice of step S1402 is also the same process as step S302 described with reference to FIG. 3. Next, in step S1403-1 to step S1403-N, the confirmation signal notifying unit 1061 of the remote activating device 100 transmits the arrival attribute confirmation signal to the device to be activated 200B multiple times (for example, N times) via the first transmitting unit 103 and the first interface 101. When the arrival attribute confirmation signal transmission notice is transmitted N times, in step S1404, the remote activating device 100 transmits the confirmation signal end notice. This process is the same process as step S304 described with reference to FIG. 3. In step S1403-1 to step S1403-N, the confirmation signal detecting unit 2062 of the device to be activated 200B detects the number of reception times (the number of arrival times) in addition to whether or not the arrival attribute confirmation signal has been received until the confirmation signal end notice is received in step S1404 and stores the detected number of reception times in the storage unit 207. FIGS. 13A and 13B illustrate examples of information stored in the storage unit 207. For example, only the number of reception times of the arrival attribute confirmation signal may be stored as illustrated in FIG. 13A. Further, the signal intensity (average signal intensity X) of the arrival attribute confirmation signal and a bit error rate (average error rate Y) of the arrival attribute confirmation signal may be stored as illustrated in FIG. 13B. Referring to FIG. 13B, the average signal intensity X and the average error rate Y which are average values of all of the arrival attribute confirmation signals during the detection time period are stored as the signal intensity and the bit error rate. The signal intensity and the bit error rate are not limited to the average values, and the signal intensity and the bit error rate of each signal or mode values may be stored.

When the confirmation signal detecting unit 2062 completes the detection time period of the confirmation signal, in step S1405, the arrival attribute notifying unit 2063 of the device to be activated 200B transmits the arrival attribute notice to the remote activating device 100. The arrival attribute notice is information including the number of reception times (M≤N) unlike step S305 of the first embodiment.

In step S1406, the judging unit 107 of the remote activating device 100 decides the activation signal transmitting interface to be used for remote activation of the device to be activated 200B based on the content of the arrival attribute notice. The remote activating device 100 decides the activation signal transmitting interface by comparing the number of reception times M included in the arrival attribute notice with a previously determined threshold value k. For example, the threshold value k may be stored in the storage unit 108 in advance and read out when the comparison is made.

When the number of reception times M is equal to or more than the threshold value k (M≥k), the judging unit 107 decides the first interface 101 as the activation signal transmitting interface. However, when the number of reception times M is smaller than the threshold value k (M<k), the judging unit 107 decides the second interface 102 as the activation signal transmitting interface. The judgment result is transmitted from the judging unit 107 to the arrival confirmation processing unit 106.

Subsequently, a process (S1047) of notifying the decided interface and processes (step S1408 and step S1409) of storing information of the activation signal transmitting interface and information of the activation signal receiving interface are the same as steps S308 and S309 described in the first embodiment.

In the above example, the judging unit 107 decides the interface by judging whether the number of reception times is equal to or more than the threshold value or less than the threshold value.

However, an arrival probability P (M/N) may be obtained based on the number of reception times M and the number of transmission times N, and the activation signal transmitting interface may be decided based on a magnitude relation between the arrival probability P and a predetermined threshold value p. For example, the judging unit selects the first interface 101 when the arrival probability P is equal to or more than the predetermined threshold value p and select the second interface 102 when the arrival probability P is smaller than the predetermined threshold value p.

In the above example, the two interfaces are described as an example, but three or more interfaces may be provided similarly to the modified embodiment 1 of the first embodiment. For example, when four interfaces are provided similarly to the modified embodiment 1 of the first embodiment, the processes of step S1403-1 to step S1403-N are sequentially performed on each of the first interface 101, the third interface 111, and the fourth interface 121. The confirmation signal detecting unit 2062 of the device to be activated 200B detects the number of reception times of the arrival attribute confirmation signal for each of the interfaces and stores the number of reception times in the storage unit 207. FIGS. 13C and 13D illustrate examples of information stored in the storage unit 207. In the example of FIGS. 13C and 13D, the number of reception times of the first interface, the third interface, and the fourth interface are represented by M1 times, M3 times, and M4 times, respectively. When confirmation is performed on the plurality of interfaces, the threshold value k may be set for each of the interfaces, and one threshold value may be used for the whole device.

According to the system of the remote activating device 100 and the remotely device to be activated 200A and 200B of the present embodiment, the number of arrival times (the number of reception times) of the arrival attribute confirmation signal is confirmed through the first interface having the smaller communication coverage than the second interface in advance. The first interfaces having low power consumption are used as the activation signal transmitting interface and the activation signal receiving interface when the number of arrival times is equal to or more than the threshold value; and the second interfaces are used as the activation signal transmitting interface and the activation signal receiving interface when the number of arrival times is smaller than the threshold value. Since it is confirmed in advance whether or not communication can be performed between the interfaces, the remote activation can be reliably performed at low power consumption.

Further, since the arrival attribute confirmation signal is transmitted multiple times between the remote activating device 100 and the device to be activated 200, it is possible to more reliably judge whether or not communication can be performed between the remote activating device 100 and the device to be activated 200.

<Third Embodiment>

Next, a remote activating device 100 according to a third embodiment of the present invention will be described. Configurations of the remote activating device 100 and a device to be activated 200 according to the third embodiment are the same as the configurations of the remote activating device 100 and the device to be activated 200 of FIG. 1, respectively, and thus the configurations will be described with reference to FIG. 1.

The remote activating device 100 according to the third embodiment of the present invention is different from the remote activating device 100 according to the second embodiment in that the number of transmission times of the activation signal is decided according to the number of transmission times of the arrival attribute confirmation signal and the number of reception times of the arrival attribute confirmation signal of the device to be activated.

Next, a detailed description will be made in connection with a process of deciding the activation signal transmitting interface and the activation signal receiving interface between the remote activating device 100 and the device to be activated 200 according to the third embodiment of the present invention. The description will be made with reference to FIG. 14.

The processes of from steps S1401 to step S1402 are the same, and thus a redundant description thereof will not be repeated. In steps S1403-1 to S1403-N, the arrival attribute confirmation signal may be transmitted using the second interface so as to decide the number of transmission times. After the arrival attribute confirmation signal is transmitted, in step S1404 and S1405, the remote activating device 100 notifies the confirmation signal end notice, and the device to be activated 200 notifies the remote activating device 100 of the arrival attribute notice including the number of reception times of each of the first interface and the second interface.

In step S1406, the judging unit 107 obtains the arrival probability P (M/N) based on the number of reception times (the number of arrival times) (M) and the number of transmission times (N) of each of the first interface 101 and the second interface 102. Next, the activation signal transmitting interface is decided based on the magnitude relation between the arrival probability P on the first interface 101 and the predetermined threshold value p. For example, the judging unit 107 selects the first interface 101 when the arrival probability P on the first interface 101 is equal to or more than the predetermined threshold value p and selects the second interface 102 when the arrival probability P on the first interface 101 is smaller than the predetermined threshold value p.

Next, the judging unit 107 decides the number of transmission times for transmitting the activation signal on the selected activation signal transmitting interface. For example, the number of transmission times is decided using the previously obtained arrival probability P of the activation signal transmitting interface. For example, as the number of transmission times, obtained is a minimum x that satisfies Formula I with respect to a threshold value n on a previously set success probability of remote activation and the arrival probability P. In order to reduce a calculation load caused by a calculation of x, xs with respect to the threshold value n and several major arrival probabilities P may be calculated in advance, and a correspondence table may be stored in the storage unit 108, so that a calculation process may be omitted.

$$(1-P)^x < (1-n) \qquad (1)$$

Formula 1 represents that a probability that all transmissions will fail when the activation signal is transmitted x times is the minimum number of transmission times smaller than a predetermined failure probability (1−n).

Figures 15, 16:
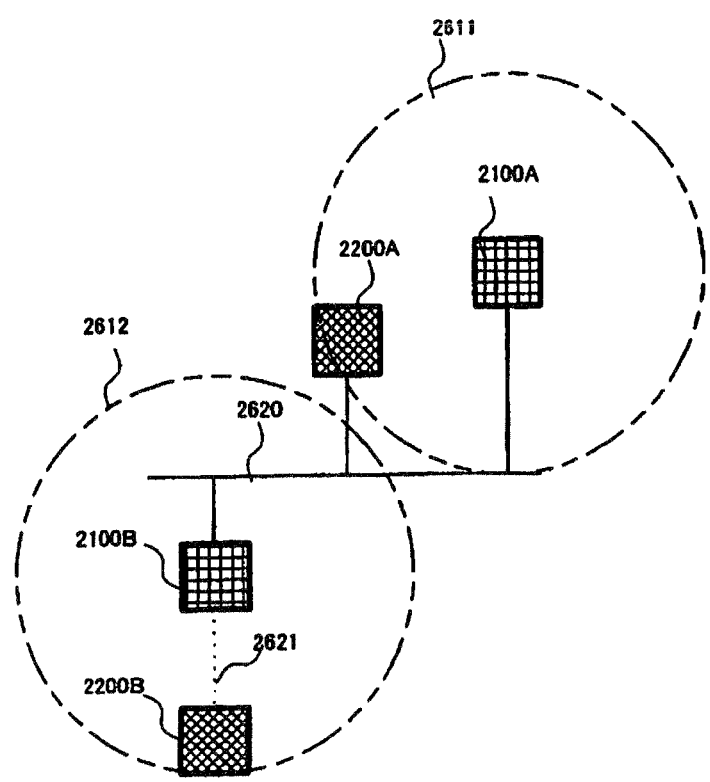
FIG. 15 is a diagram illustrating an example of information stored in a storage unit 108 of the remote activating device according to the third embodiment of the present invention.
FIG. 16 is a diagram illustrating an example of a remote activating system according to a fourth embodiment of the present invention.

Next, in step S1407, the decided interface is notified. Step S1407 is the same as the process described in the second embodiment. Next, in step S1408, the remote activating device 100 stores information specifying the activation signal transmitting interface and the number of transmission times x of the activation signal obtained in step S1406 in the storage unit 108 together. The device to be activated 200 stores information specifying the activation signal receiving interface in the storage unit 207. FIG. 15 illustrates an example of information stored in the storage unit 108. In the example of FIG. 15, the storage unit 108 stores an ID specifying the device to be activated of a remote activation target, information specifying the activation signal transmitting interface, and the number of transmission times of the activation signal. For example, as described above, the storage unit 108 stores the second interface having the large communication coverage as the activation signal transmitting interface and once as the number of transmission times of the activation signal with respect to the device to be activated 200A. Further, the storage unit 108 stores the first interface 101 as the activation signal transmitting interface and three times as the number of transmission times of the activation signal with respect to the device to be activated 200B. Thus, the remote activating device 100 transmits the activation signal once using the second interface 102 so as to activate the device to be activated 200A and transmits the activations signal three times using the first interface 101 so as to activate the device to be activated 200B.

According to the remote activating device 100 and the device to be activated 200 of the present embodiment, the arrival probability of the arrival attribute confirmation signal is obtained, the number of transmission times of the activation signal transmitted through each interface is decided according to the magnitude of the arrival probability, and the activation signal is transmitted by the number of transmission times. Thus, the device to be activated can be more reliably activated.

<Fourth Embodiment>

Next, a remote activating device according to a fourth embodiment will be described. The fourth embodiment is different from the first to third embodiments in that two remote activating devices are connected to a network.

In a remote activating system of the present embodiment, since a plurality of remote activating devices are present, the remote activating devices may have different activation signal transmitting interfaces with respect to one device to be activated as a result of executing the remote activation arrival attribute confirmation phase. In this case, the device to be activated decides one appropriate standby interface based on information related to the notified activation signal transmitting interface. Further, information of the standby interface and information of the activation signal arrival attribute confirmation phase are notified to another remote activating device connected to the network. Each remote activating device can acquire information of another remote activating device, and thus when the own device is difficult to activate the device to be activated, each remote activating device may request another remote activating device to perform proxy remote activation.

FIG. 16 illustrates an example of the remote activating system according to the fourth embodiment.

As illustrated in FIG. 16, the remote activating system according to the fourth embodiment includes a remote activating device 2100A, a remote activating device 2100B, a device to be activated 2200A, and a device to be activated 2200B, which are connected via a second network. The remote activating devices 2100A and 2100B and the device to be activated 2200A are connected to one another via a wire line network 2620. The device to be activated 2200B is connected to the wire line network 2620 via a wireless link 2621 between the device to be activated 2200B. Here, the wire line network 2620 and the wireless link 2621 are referred to as "second network" together. All of the remote activating device 2100A, the remote activating device 2100B, and the device to be activated 2200A and 2200B are connected via the second network. For example, the remote activating device 2100B has a bridge function or a router function. The remote activating device 2100B includes a wire line interface connected to the wire line network 2620 and a wireless interface connected to a wireless link 2621 but does not discriminate the interfaces as the second interface connected to the second network.

Arrival ranges of signals transmitted from the remote activating devices 2100A and 2100B via the first network are represented by circles 2611 and 2612 indicated by two-dot chain lines, respectively. A signal transmitted from the remote activating device 2100A via the first network arrives at the device to be activated 2200A but does not arrive at the device to be activated 2200B. A signal transmitted from the remote activating device 2100B via the first network arrives at the device to be activated 2200B but does not arrive at the device to be activated 2200A.

Figure 17:
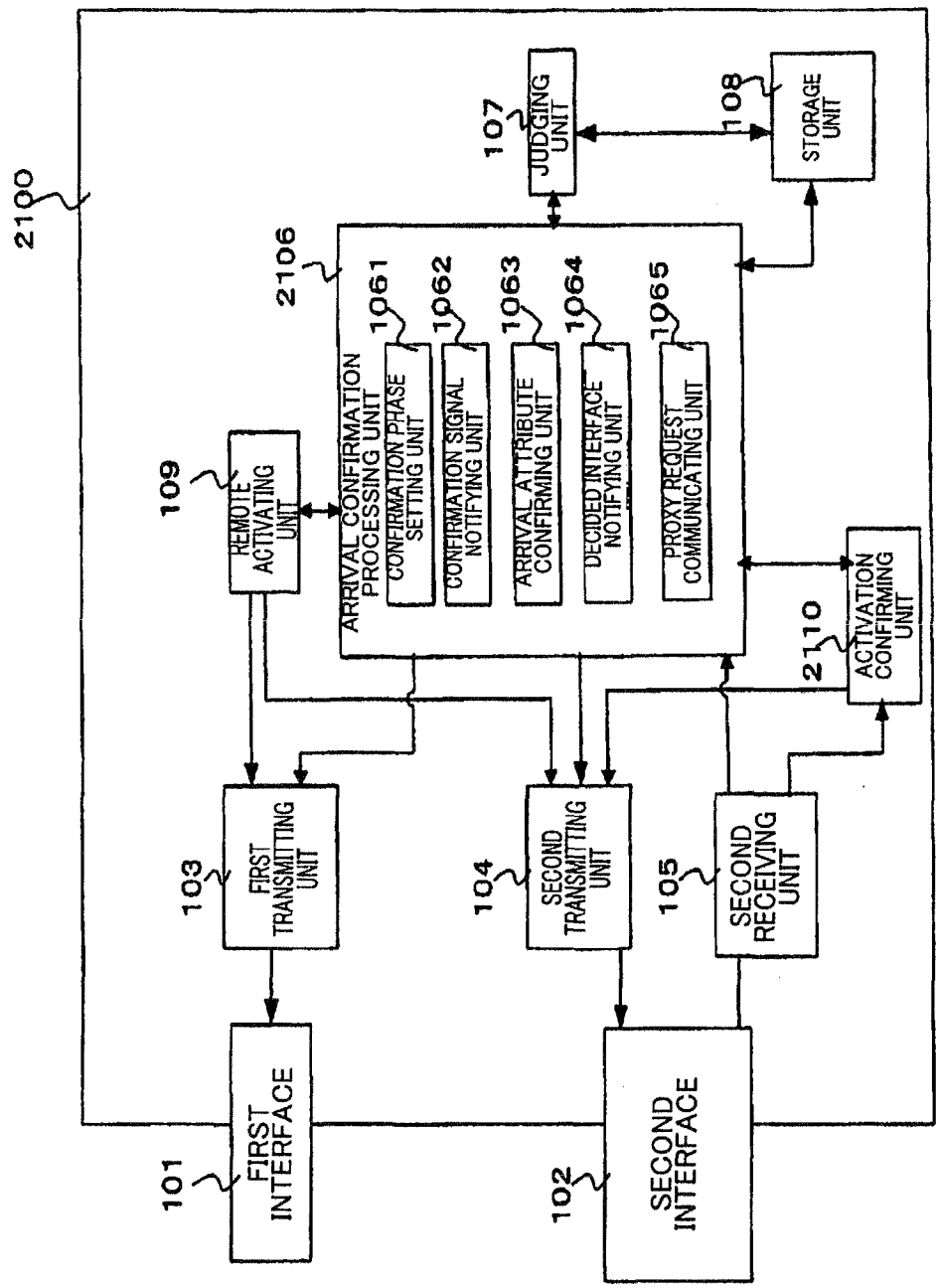
FIG. 17 is a block diagram illustrating a configuration of a remote activating device according to the fourth embodiment.

FIG. 17 is a block diagram illustrating a configuration of a remote activating device 2100 according to the fourth embodiment of the present invention. Both of the remote activating devices 2100A and 2100B have the same configuration as the remote activating device 2100. The remote activating device 2100 further includes an activation confirming unit 2110 in addition to the configuration of the remote activating device 100. An arrival confirmation processing unit 2106 further includes a proxy request communicating unit 1065 in addition to the configuration of the arrival confirmation processing unit 106 of the first embodiment.

The proxy request communicating unit 1065 transmits a remote activation proxy request notice to another remote activating device when the own device is difficult to perform the remote activation. Further, the proxy request communicating unit 1065 receives the remote activation proxy request notice from another remote activating device when another device is difficult to perform the remote activation.

The activation confirming unit 2110 confirms whether or not the device to be activated 2200 of the remote activation target has been activated via the second transmitting unit 104 and the second interface 102.

The storage unit 108 of the remote activating device 2100 further includes an activation information database. The activation information database stores an ID specifying the device to be activated of the remote activation target regarded by the remote activating device 2100, an ID of the remote activating device that has performed the arrival attribute confirmation phase together with the device to be activated, information specifying the network connected to the activation signal transmitting interface decided by the arrival attribute confirmation phase, and information specifying the network connected to the activation signal receiving interface decided by the device to be activated.

The judging unit 107 of the remote activating device 2100 judges the necessity for requesting another remote activating device to perform remote activation and the remote activating device of a request target.

Figure 18:
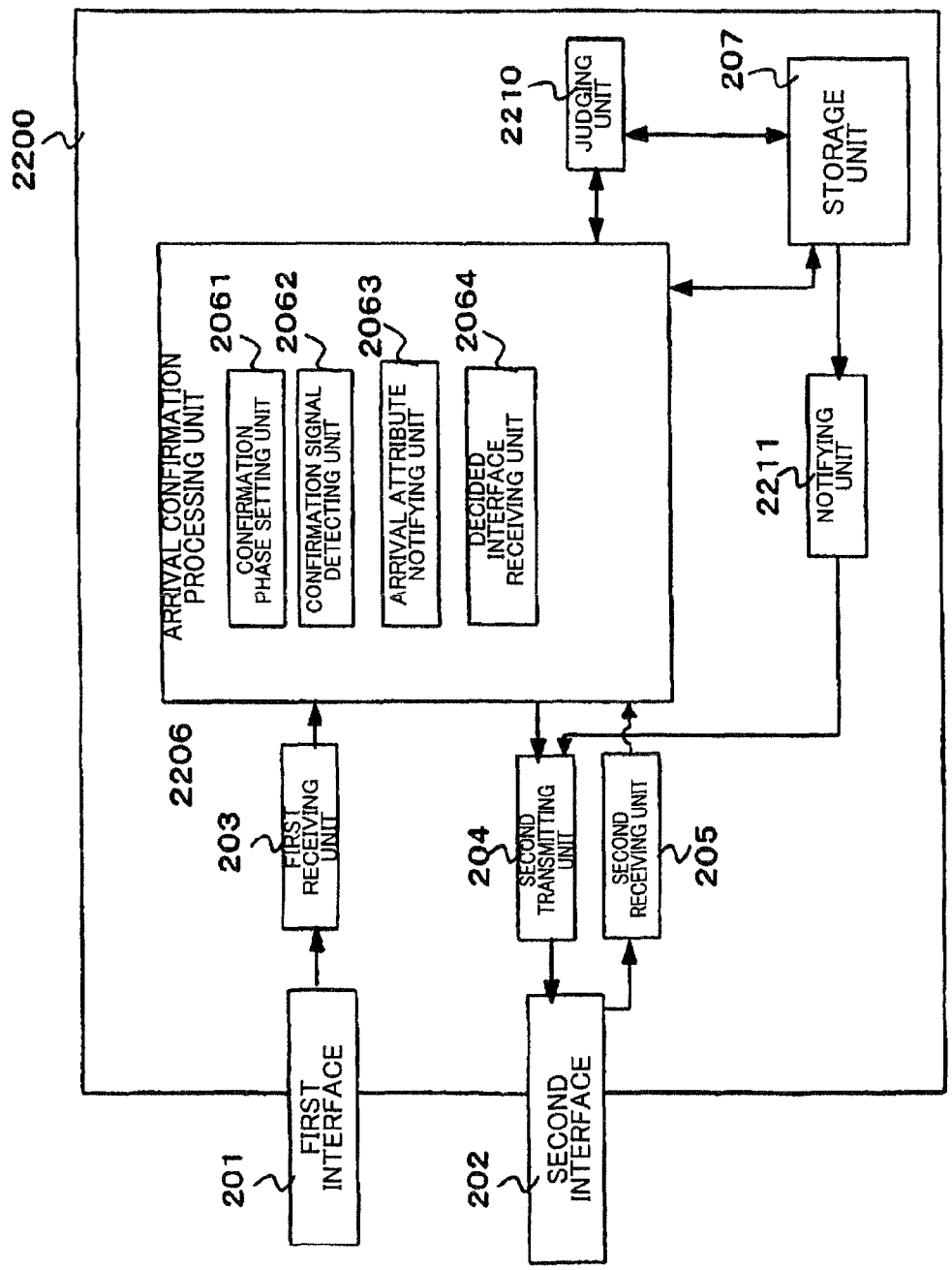
FIG. 18 is a block diagram illustrating a configuration of a device to be activated according to the fourth embodiment.

FIG. 18 is a block diagram illustrating a configuration of a device to be activated 2200 according to the fourth embodiment of the present invention. Both of the device to be activated 2200A and 2200B have the same configuration as the configuration of the device to be activated 2200. The device to be activated 2200 further includes a judging unit 2210 and a notifying unit 2211 in addition to the configuration of the device to be activated 200 according to the first embodiment.

After the remote activating device 2100 decides the activation signal transmitting interface, the judging unit 2210 receives the decided interface notice and then decides the activation signal receiving interface (the standby interface).

The storage unit 207 stores an activation information database. The activation information database includes an ID of the remote activating device that has performed the arrival attribute confirmation phase and information specifying the network connected to the activation transmitting interface decided through the arrival attribute confirmation phase by the remote activating device as illustrated in FIG. 20. The storage unit 207 stores information specifying the activation signal receiving interface (the standby interface).

After the judging unit 2210 decides the activation signal receiving interface, the notifying unit 2211 notifies the remote activating device connected to the second network of the information specifying the network connected to the activation signal receiving interface (the standby interface) via the second network.

Figure 19:
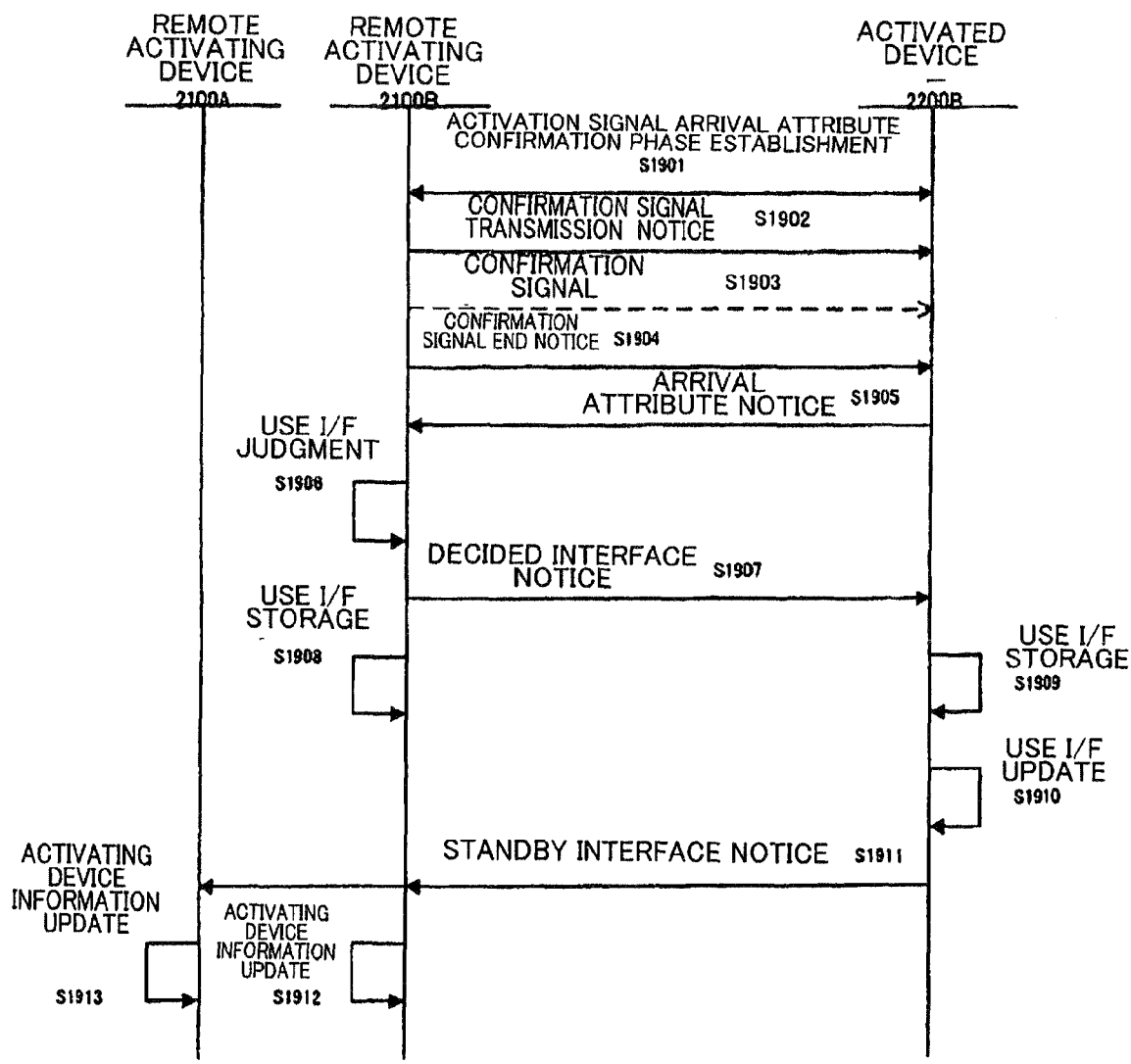
FIG. 19 is a sequence diagram illustrating an operation executed between the remote activating device and the device to be activated according to the fourth embodiment.

Next, an operation of the remote activating system according to the fourth embodiment will be described. FIG. 19 is a sequence diagram illustrating an operation between the remote activating device 2100B and the device to be activated 2200B in the remote activating system according to the fourth embodiment. FIG. 19 is a diagram for explaining a process of deciding the activation signal transmitting interface by the remote activating device 2100B (referred to as "transmitting interface deciding process"), a process of deciding the activation signal receiving interface by the device to be activated 2200B (referred to as "standby interface deciding process"), and a process of notifying the remote activating device 2100A and the remote activating device 2110B of information of the standby interface by the device to be activated 2200B (referred to as "standby interface notifying process") when the remote activating device 2100B and the device to be activated 2200B execute the activation signal arrival attribute confirmation phase in the first network.

The following process will be described focusing on a process between the remote activating device 2100B and the device to be activated 2200B, but it is assumed that the same process has been executed between other devices (between the remote activating device 2100A and the device to be activated 2200A, between the remote activating device 2100A and the device to be activated 2200B, and between the remote activating device 2100B and the device to be activated 2200A).

First, the transmitting interface deciding process will be described.

The transmitting interface deciding process is the same as the process described in the first embodiment. That is, processes of from step S1901 to step S1907 are the same as the processes of from step S301 to step S307 of FIG. 3. A signal transmitted from the remote activating device 2100B via the first interface 101 and the first network arrives at the remote device to be activated 2200B as described with reference to FIG. 16. Thus, the first interface 101 is decided as the activation signal transmitting interface.

Next, the standby interface deciding process will be described.

When the activation signal transmitting interface is decided by the remote activating device 2100B, the device to be activated 2200B receives the decided interface notice (information specifying the network connected to the activation signal transmitting interface). The judging unit 2210 receives the decided interface notice and then compares information specifying a network connected to the interface with information specifying a network connected to the activation signal transmitting interface included in the decided interface notice when the standby interface has been already selected. When the selected standby interface is different from the interface included in the decided interface notice, an interface capable of performing a "more appropriate" standby is selected as the standby interface. However, when the selected standby interface matches with the interface included in the decided interface notice, the current standby interface is maintained. Further, when the standby interface is not selected yet, in step S1909, the interface included in the decided interface notice is selected as the standby interface. For example, the interface capable of performing the "more appropriate standby" refers to an interface capable of awaiting the activation signal from many remote activating devices. The device to be activated 2200B stores an ID specifying the remote activating device and information specifying the activation signal transmitting interface for each remote activating device, and the activation transmitting receiving interface dealing with many activation signal transmitting interfaces is selected as the standby interface. Further, the interface capable of performing the "more appropriate standby" may refer to an interface capable of awaiting the activation signal at lower consumption energy. Further, the interface capable of performing the "more appropriate standby" refers to an interface may refer to an interface causing the activation signal to more reliably arrive at or an interface used for activation by the remote activating device having a higher priority. A condition for deciding the interface capable of performing the "more appropriate standby" may be stored in the storage unit 207 of the device to be activated 2200B in advance or may be notified through the decided interface notice from the remote activating device 2100B. In this example, it is assumed that the standby interface selected before the decided interface notice has been the second interface. Then, the judging unit 2210 compares the first interface notified by the decided interface with the second interface and decides the first interface as the "more appropriate" standby interface. When the standby interface is decided by the judging unit 2210, in step S1910, information specifying the standby interface stored in the storage unit 207 is updated. The device to be activated 2200B updates the activation information database. That is, an ID of the remote activating device that has executed the arrival attribute confirmation phase and information specifying the network connected to the activation signal transmitting interface decided through the arrival attribute confirmation phase by the corresponding remote activating device are added. FIG. 20 illustrates an example in which the activation information database is updated. As illustrated in FIG. 20, an entry 2002 is added by the update. That is, an ID specifying the remote activating device 2100B and the information specifying the network connected to the first interface 101 are stored. In the case of deciding the "more appropriate" standby interface, when the interface capable of awaiting the activation signals from many remote activating devices is selected, the interface capable of awaiting the largest number of activation signals among the interfaces stored in the activation information database may be selected.

It is assumed that the device to be activated 2100B has previously executed the arrival attribute confirmation process with remote activating device 2100A as illustrated in the activation information database. As can be seen from an entry 2001, the remote activating device 2100A selects the second interface as the activation signal transmitting interface. The reason why this selection has been made is because the signal transmitted from the remote activating device 2100A has arrived at via the second network but has not arrived at via the first network (the arrival range 2612) as illustrated in FIG. 16.

Next, the standby interface notifying process will be described.

In step S1911, the device to be activated 2200B transmits a standby interface notice including information of the activation information database and the standby interface to the remote activating device that has executed the arrival attribute confirmation phase via the second transmitting unit 204 and the second interface 202. The remote activating device that has executed the arrival attribute confirmation phase refers to a remote activating device included in the activation information database illustrated in FIG. 20. In this example, the remote activating device that has executed the arrival attribute confirmation phase includes the remote activating devices 2100A and 2100B. Information included in the standby interface notice includes information of an entry newly updated in the activation information database (an identifier of the remote activating device that has most recently executed the arrival attribute confirmation phase (in this example, an ID of the remote activating device 2100B)), information specifying the network connected to the activation signal transmitting interface decided by the corresponding confirmation phase (in this example, information specifying the network connected to the first interface), and information specifying the network connected to the standby interface decided by the standby interface deciding process (in this example, information specifying the network connected to the first interface). The standby interface notice may be transmitted to the remote activating device in a multicast manner or may be transmitted to each remote activating device in a unicast manner.

The remote activating device (in this example, the remote activating devices 2100A and 2100B) that has received the standby interface notice updates the activation information database of the storage unit 108. Updated information of the activation information database is illustrated in FIG. 21A, and non-updated information is illustrated in FIG. 21B. Specifically, the update of the activation information database is performed twice. In a first update, an ID of the device to be activated 2200B before notification of the standby interface notice and three pieces of information included in the standby interface notice (in FIGS. 21A and 21B, addition of an entry 2004) are stored as illustrated in FIGS. 21A and 21B. The three pieces of information included in the standby interface notice includes an identifier of the remote activating device that has executed the arrival attribute confirmation phase with the device to be activated before notification of the standby interface notice (in this example, an ID of the remote activating device 2100B), information specifying the network connected to the activation signal transmitting interface decided by the corresponding confirmation phase (in this example, information specifying the network connected to the first interface), and information specifying the network connected to the standby interface decided by the standby interface deciding process (in this example, information specifying the network connected to the first interface) as described above. In a second update of the activation information database, information of the standby interface of the device to be activated 2200B before notification of the standby interface notice is updated. As illustrated in FIG. 21A (after update) and FIG. 21B (before update), the standby interface of the entry 2003 changes from the second interface to the first interface. By the update of the activation information database, a result of the arrival attribute confirmation phase (an ID identifying the device to be activated, an ID identifying the activating device, and information specifying the network connected to the activation signal transmitting interface) can be shared between each remote activating device and the device to be activated connected to the network, and information of the standby interface can be shared in steps S1912 and S1913.

Figure 22:
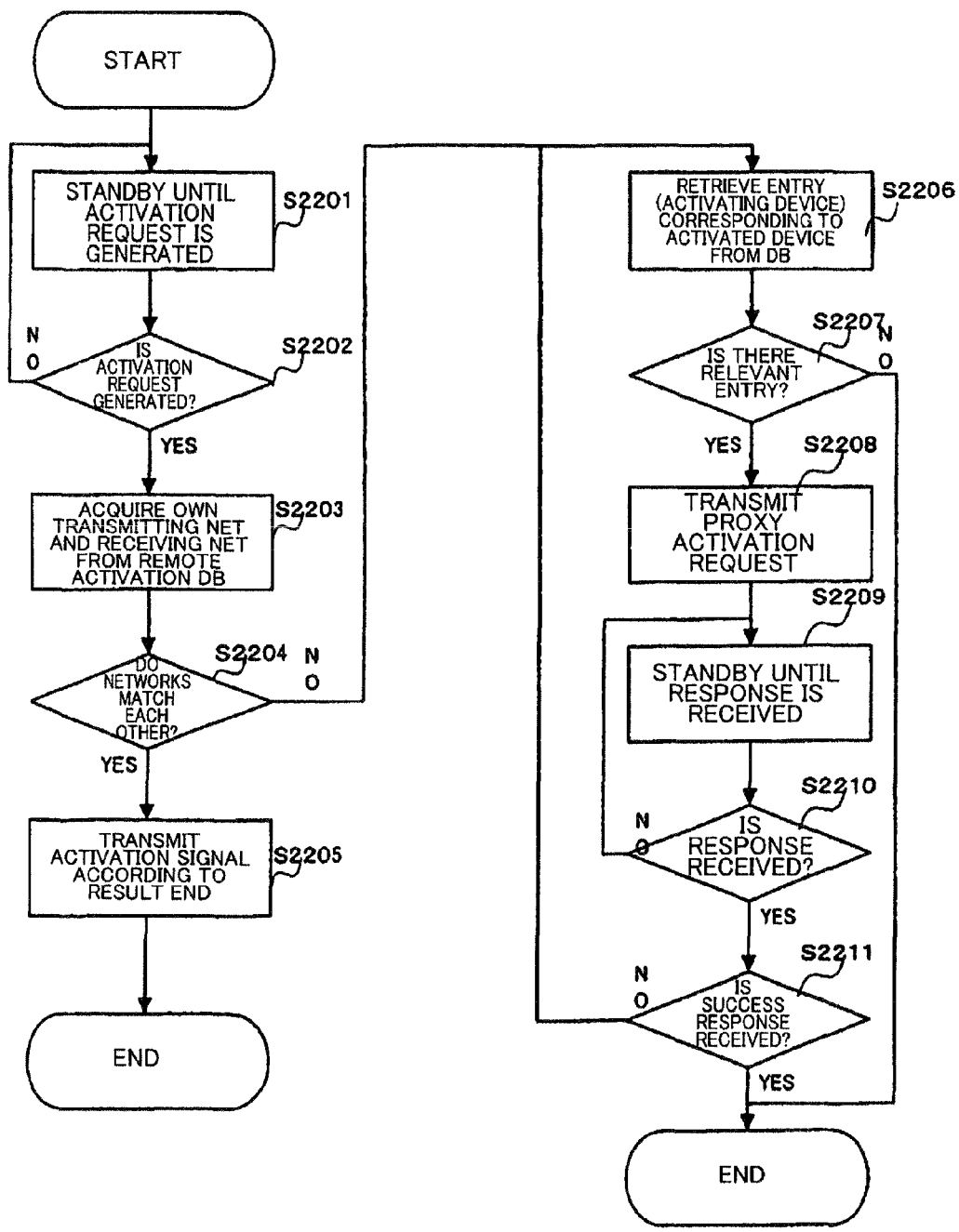
FIG. 22 is a flowchart illustrating an operation of the remote activating device according to the fourth embodiment.

Next, a description will be made in connection with a process executed when remote activation is performed in the remote activating system according to the present embodiment. FIG. 22 is a flowchart illustrating an operation when the remote activating device transmits a remote activation signal.

First, a description will be made in connection with a case in which the remote activating device 2100B remotely activates the device to be activated 2200B. First, in steps S2201 and S2202, the remote activating device 2100B receives an activation request from a certain device on a network (including a non-stated one).

First, the judging unit 107 judges whether or not the own device can perform remote activation. In steps S2203 and S2204, the judging unit 107 refers to the activation information database stored in the storage unit 108 and makes the judgment based on whether or not the network connected to the standby interface of the device to be activated 2200B of the target matches with the network connected to the activation signal transmitting interface of the own device. When it is judged that the network connected to the standby interface matches with the network connected to the activation signal transmitting interface of the own device, the judging unit 107 judges that the own device can perform remote activation. However, it is judged that the network connected to the standby interface does not match with the network connected to the activation signal transmitting interface of the own device, the judging unit 107 judges that the own device is difficult to perform remote activation. In this example, since the two networks are matched with each other as can be seen from an entry 2104 of FIG. 21A, it is judged that the remote activation is possible. Thus, in step S2205, the remote activating device 2100B generates the activation signal and transmits the activation signal to the device to be activated 2200B.

Next, a description will be made in connection with a case in which the remote activating device 2100B remotely activates the device to be activated 2200A. First, in steps S2201 and S2202, the remote activating device 2100B receives an activation request from a certain device on a network (including anon-stated one). First, in step S2203, the judging unit 107 judges whether or not the own device can perform remote activation. In this example, since the network connected to the activation signal transmitting interface of the remote activating device 2100B does not match with the network connected to the standby interface of the device to be activated 2200A as can be seen from an entry 2102 of FIG. 21A, it is judged that the own device is difficult to perform remote activation (No in step S2204).

Next, in step S2206, the proxy request communicating unit 1065 of the arrival confirmation processing unit 2106 refers to the entry of a remote activation database and retrieves an entry corresponding to the device to be activated 2200A. As a result of retrieval, when an entry corresponding to the device to be activated 2200A is not found (No in step S2207), it is judged that remote control is difficult to perform, and thus the process is finished. In this example, since an entry 2001 is found as an entry corresponding to the device to be activated 2200A, the process proceeds to next step (Yes in step S2207).

In step S2208, the proxy request communicating unit 1065 of the remote activating device 2100B transmits a proxy activation request notice to the remote activating device 2100A stated in the entry 2101. The proxy activation request notice includes an identifier of the device to be activated 2200A which is a remote activation target and the content instructing activation of the device to be activated 2200A. After transmission of the proxy activation request notice, in step S2209, the remote activating device 2100B is awaiting a response from the remote activating device 2100A. A process of the remote activating device 2100A that has received the proxy activation request notice will be described later.

When an activation success response is received from the remote activating device 2100A (Yes in step S2210 and Yes in step S2211), the remote activating device 2100B judges that remote activation has been successful and then finishes the process. However, when an activation failure response is received (Yes in step S2210 and No in step S2211), in step S2206, another entry having the device to be activated 2200A is retrieved. When there is another entry (Yes in step S2207), in step S2208, the proxy activation request is repetitively transmitted. However, when there is no entry (No in step S2207), it is judged that activation is difficult to perform, and the process is finished.

Figure 23:
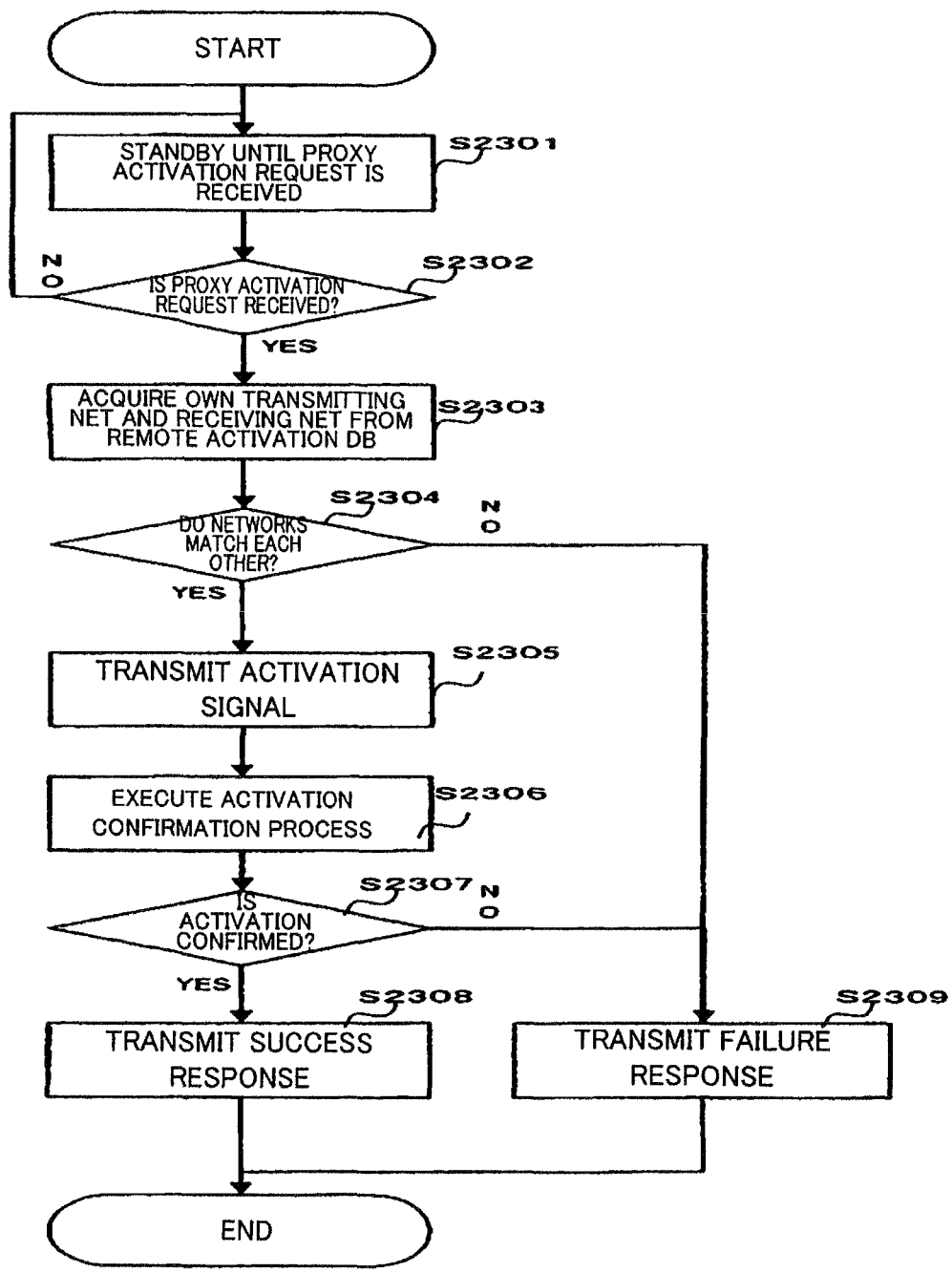
FIG. 23 is a flowchart illustrating an operation executed when a remote activating device is requested to perform proxy remote activation.

Next, a description will be made in connection with a process of the remote activating device 2100A that has received the proxy activation request notice. FIG. 23 is a flowchart illustrating an operation executed when the remote activating device is requested to perform proxy remote activation.

The proxy request communicating unit 1065 of the remote activating device 2100A receives the proxy activation request notice from the remote activating device 2100B via the network 2620 (the second network (step S2301 and Yes in step S2032) and recognizes that it is a proxy notice for an own device and the device to be activated as the remote activation target from the proxy activation request notice. The proxy request communicating unit 1065 of the remote activating device 2100B notifies the judging unit 107 of the proxy activation request notice.

In steps S2303 and S2304, the judging unit 107 refers to the remote activation database and confirms whether or not the network connected to the activation signal transmitting interface of the own device matches with the network connected to the standby interface of the device to be activated 2200B which is an activation target.

When the network connected to the activation signal transmitting interface of the own device does not match with the network connected to the standby interface of the device to be activated 2200 (No in step S2304), the proxy request communication unit 1065 is notified of the fact that it is difficult to perform remote activation. The proxy request communicating unit 1065 that has been notified of the fact transmits a failure response to a transmission source of the proxy activation request notice (in this example, the remote activating device 2100B). Meanwhile, when the network connected to the activation signal transmitting interface of the own device matches with the network connected to the standby interface of the device to be activated 2200 (Yes in step S2304), the arrival confirmation processing unit 2106 is notified of the fact that remote activation can be performed. In this example, it can be seen from the entry 2101 of FIG. 21A that the network connected to the activation signal transmitting interface of the own device matches with the network connected to the standby interface of the device to be activated 2200. The arrival confirmation processing unit 2106 outputs an instruction for activating the device to be activated 2100A of the target to the remote activating unit 109. In step S2305, the remote activating unit 2100A generates the activation signal using information of the activation signal transmitting interface stored in the storage unit 108 and transmits the generated activation signal.

After transmission of the activation signal, the arrival confirmation processing unit 2106 outputs an instruction for confirming an activation state of the device to be activated 2200A to the activation confirming unit 2110. In step S2306, the activation confirming unit 2110 confirms the activation state of the device to be activated 2100A using the second interface 102 whose connection is stably secured. When activation is confirmed (Yes in step S2307), in step S2308, the activation confirming unit 2110 transmits a success response to the arrival confirmation processing unit 2106. However, when activation could not be confirmed (No in step S2307), in step S2309, the activation confirming unit 2110 transmits a failure response to the arrival confirmation processing unit 2106. The proxy request communicating unit 1065 of the arrival confirmation processing unit 2106 that has received the result from the activation confirming unit 2110 transmits a response result to the remote activating device 2100B which is a transmission source of the proxy activation request. A method of confirming activation of the device to be activated by the remote activating device may be implemented using various methods for each of the remote activating devices and the device to be activated. For example, there may be used a method of transmitting a ICMP/ICMPv6 echo request (ping) and judging the presence and absence of a response thereto or a method of monitoring a network during a certain time and detecting whether or not a packet (DHCP or router solicitation) for attempting to acquire ARP/neighbor discovery or an address or a packet (a broadcast packet or a multicast packet to a corresponding node) for confirming any other operation has been transmitted.

In the remote activating system according to the fourth embodiment, after performing the activation signal arrival attribute confirmation phase with the remote activating device, the device to be activated updates the standby interface and notifies a plurality of remote activating devices on the network of the execution result of the activation signal arrival attribute confirmation phase and information of the standby interface. Thus, the device to be activated can share the execution result of the activation signal arrival attribute confirmation phase and information related to the standby interface of the device to be activated with the remote activating devices. The device to be activated can cooperate with the remote activating device using the information, and thus remote activation can be more reliably implemented. As a result, reliable remote activation can be implemented. Particularly, the remote activating device that can implement remote activation with a higher probability can be effectively utilized in an environment in which an arrival attribute in the network greatly changes depending on each device.

The device to be activated can update the standby interface and select a more efficient standby interface whenever the activation signal arrival attribute confirmation phase is performed.

The present embodiment has been described in connection with the example in which the two remote activating devices and the two device to be activated are disposed. However, the number of devices is not limited to two. The same application can be made even when three or more devices are disposed. Further, the number of interfaces of each of the remote activating devices and the device to be activated is not limited to two.

Further, the present embodiment has been described in connection with the example in which the number of standby interfaces of the device to be activated is one, but the number of standby interfaces may be two or more. In this case, the device to be activated stores a plurality of pieces of information related to the standby interfaces and notifies the remote activating device of the fact that a plurality of standby interfaces are retained.

<Fifth Embodiment>

Next, a remote activating device according to a fifth embodiment will be described.

Configurations of the remote activating device and a device to be activated according to the fifth embodiment are the same as the configurations of the remote activating device 2100 and the device to be activated 2200 according to the fourth embodiment, respectively, and a redundant description thereof will not be repeated. A description will be made focusing on a different point.

Figure 24:
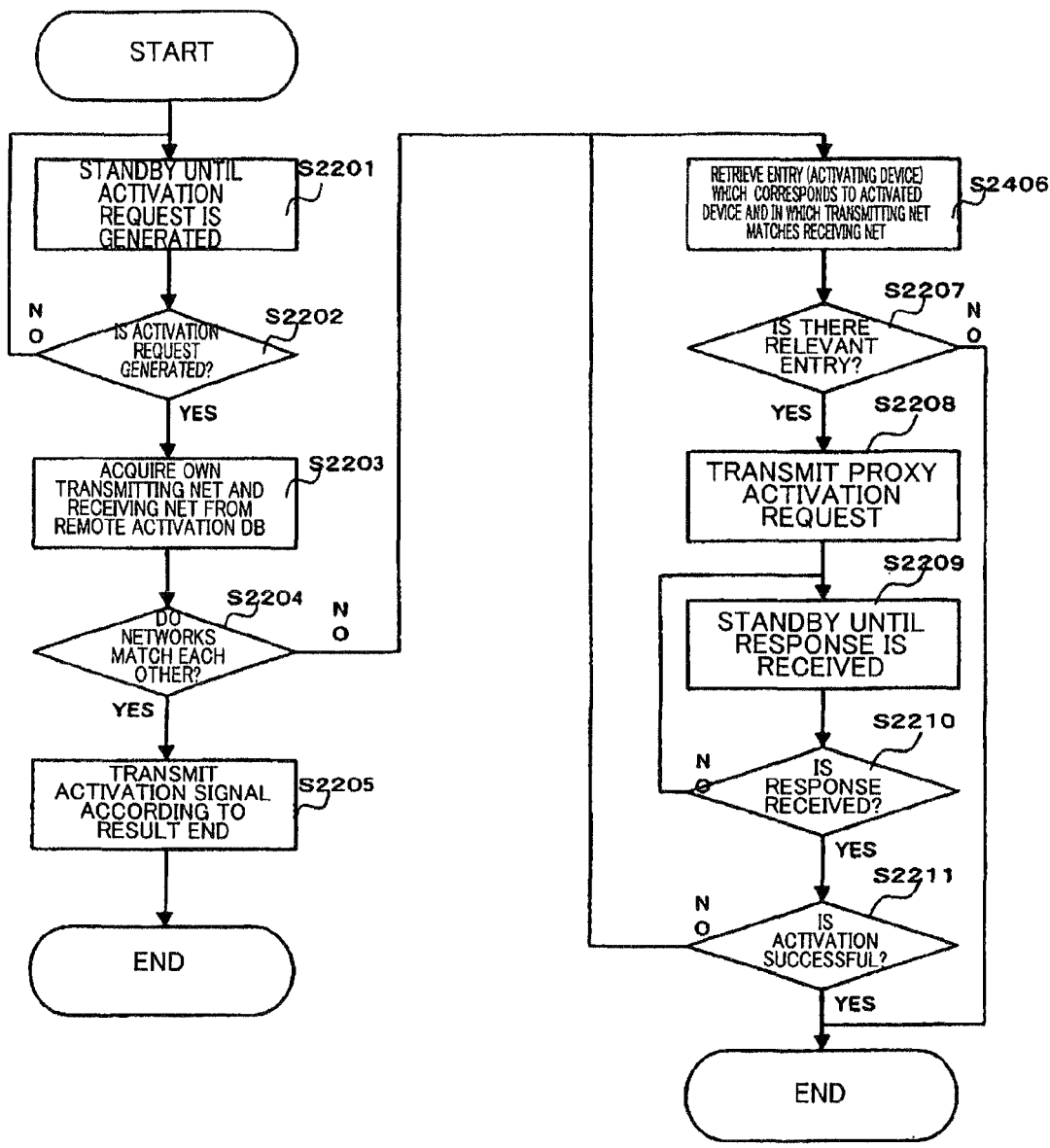
FIG. 24 is a flowchart illustrating an operation of a remote activating device according to a fifth embodiment of the present invention.
Figure 25:
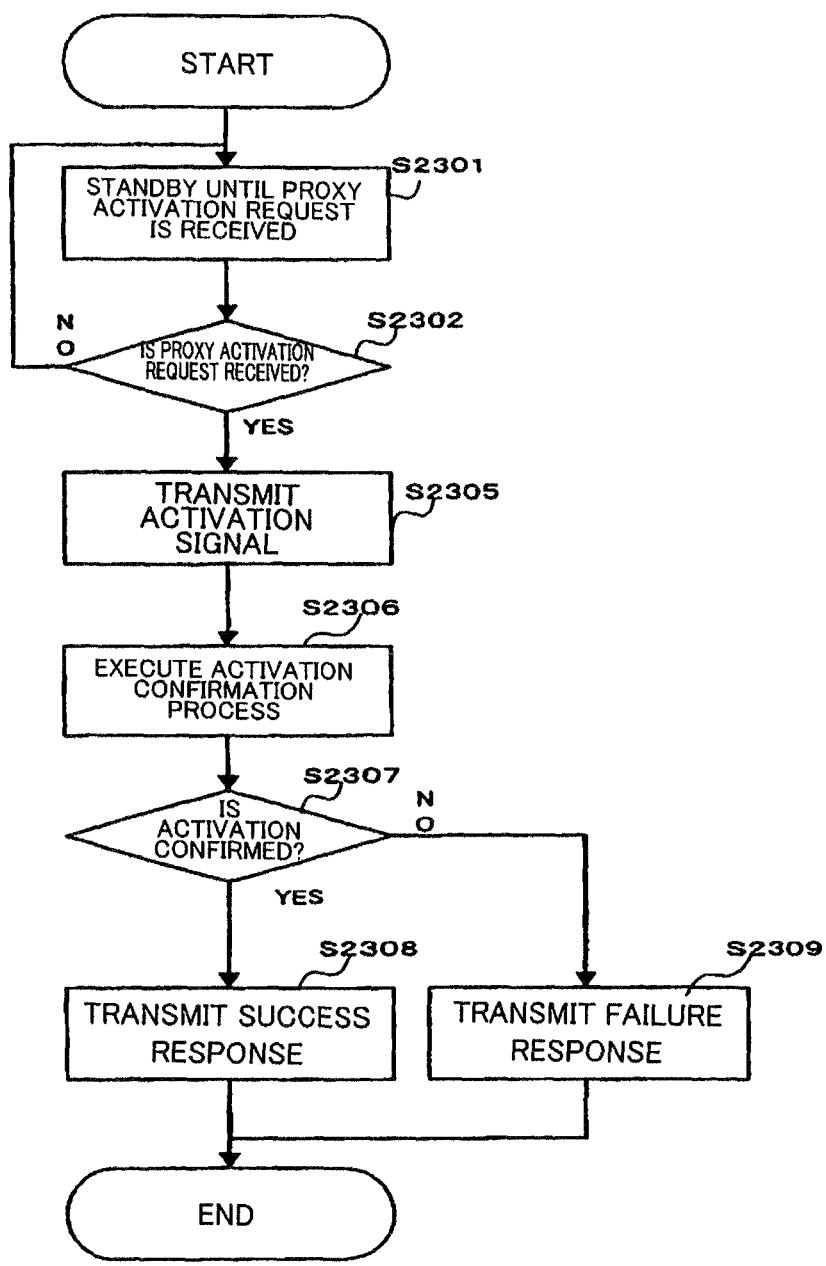
FIG. 25 is a flowchart illustrating an operation of a remote activating device according to the fifth embodiment.
Figure 27:
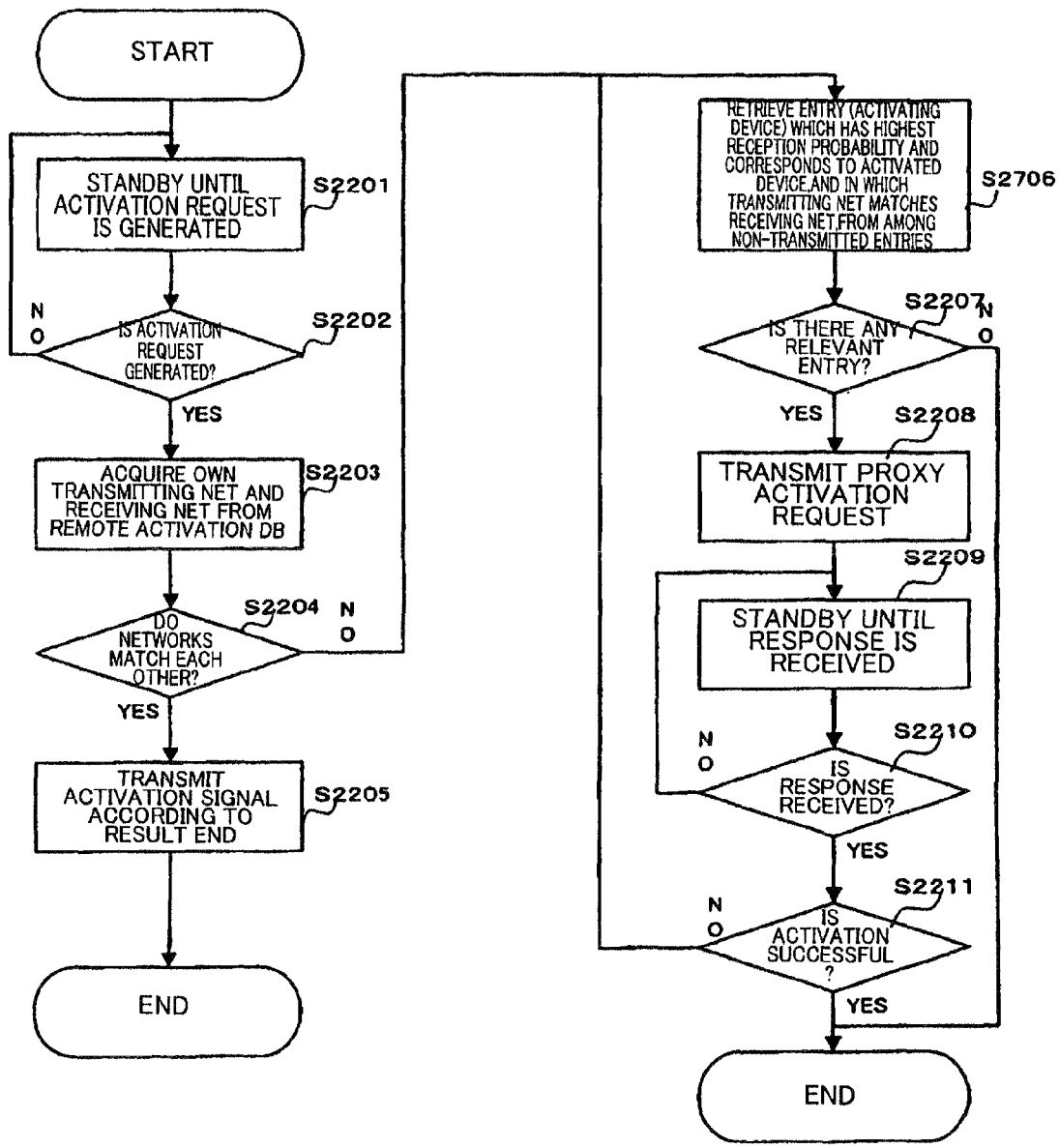
FIG. 27 is a flowchart illustrating an operation of a remote activating device according to the sixth embodiment of the present invention.

FIG. 24 illustrates a flowchart illustrating an operation of a remote activating device which requests the proxy activation. FIG. 25 illustrates a flowchart illustrating an operation of a remote activating device which is requested to perform proxy activation.

As illustrated in FIG. 24, the remote activating device 2200 according to the present embodiment is different from the remote activating device 2200 according to the fourth embodiment in that a process of step S2406 of FIG. 24 is different from the process of step S2206 of FIG. 22. That is, the process of step S2406 is different in the following point. When another remote activating device is requested to perform proxy remote activation, a judgment is made not only based on whether or not an entry for the device to be activated of the remote activation target is present among entries of the remote activation database and but also based on whether or not the network connected to the activation signal transmitting interface of the remote activating device of a corresponding entry matches with the network of the standby interface of the device to be activated of the remote activation target when the corresponding entry is present. Proxy remote activation is requested when the networks match with each other, and proxy remote activation is not requested when the networks do not match with each other.

As illustrated in FIG. 25, the remote activating device that has received the proxy activation request needs not perform the processes of steps S2303 and S2304 unlike the fourth embodiment. That is, it is unnecessary to refer to the remote activation database and confirm whether or not the network corresponding to the activation signal transmitting interface of the own device matches with the network of the standby interface of the device to be activated of the activation target. When the proxy activation request is received, the remote activating unit 2100A can generate the activation signal using information of the activation signal transmitting interface stored in the storage unit 108 and transmit the generated activation signal.

According to the remote activating device of the present embodiment, since the proxy remote activation request notice is not transmitted to the remote activation device that is difficult to perform remote activation, an unnecessary request notice can be prevented, and thus remote activation can be more reliably executed.

<Sixth Embodiment>

Next, a remote activating device according to a sixth embodiment will be described. Configurations of the remote activating device and a device to be activated according to the sixth embodiment are the same as the configurations of the remote activating device 2100 and the device to be activated 2200 according to the fourth embodiment, respectively, and a redundant description thereof will not be repeated. A description will be made focusing on a different point.

A remote activating system according to the sixth embodiment includes three remote activating devices 2100A, 2100B, and 2100C. In an operation of the remote activating system according to the sixth embodiment, the transmitting interface deciding process, the standby interface deciding process, and the standby interface notifying process are the same as the processes of the fourth embodiment described in FIG. 19 in the remote activating system according to the fourth embodiment.

As a result of performing the three processes between each of the three remote activating devices 2100A, 2100B, and 2100C and each of the two device to be activated 2200A and 2200B, the storage unit 108 of each of the remote activating devices 2100A, 2100B, and 2100C includes an activation signal information database illustrated in FIG. 26. The activation information database further stores an arrival probability (a reception probability) of the arrival confirmation signal compared to the activation information database illustrated in FIG. 21 in the fourth embodiment. The arrival probability can be calculated in an activation signal transmitting interface deciding phase by the method described in the second embodiment. In order to store the arrival probability in the activation signal information database of the storage unit 108 of each of the three remote activating devices 2100A, 2100B, and 2100C, the following three steps are preferably performed. That is, the arrival probability of the arrival confirmation signal is notified through the decided interface notice from the remote activating device to the device to be activated together with the information specifying the activation signal interface. Next, the device to be activated that has received the arrival probability also stores the arrival probability in the activation information database, which is stored in the storage unit 207, described in FIG. 20. Then, the device to be activated notifies the remote activating device of the arrival probability together when notifying the remote activating device of the information specifying the standby interface. This method enables the arrival probability to be stored in the activation signal information database and shared between the remote activating devices.

For example, let us assume that there has been an instruction for instructing the remote activating device 2100B to activate the device to be activated 2200A. In this case, since the network connected to the activation transmitting interface of the remote activating device 2100B does not match with the network connected to the standby interface of the activating device 2200A in the activation information database of FIG. 26, the remote activating device 2100B transmits the proxy activation request notice to another remote activating device. Referring to the entry of the activation information database of FIG. 26, the remote activating device for activating the device to be activated 2200A includes the two remote activating devices 2100A and 2100C except the remote activating device 2100B. In both of the two remote activating devices 2100A and 2100C, the network connected to the activation signal transmitting interface matches with the network connected to the standby interface. In this case, in the present embodiment, the proxy activation request notice is transmitted to the remote activating device having the higher arrival probability by an additional judgment criterion for deciding the remote activating device to be notified of the proxy activation request.

Thus, since the remote activating device that can more reliably perform remote activation is preferentially used, a time taken until activation is completed can be further reduced. Further, there is an effect capable of reducing energy expended due to retransmission or failure.

In the present embodiment, the arrival probability of the arrival confirmation signal is stored in the activation information database, and when the proxy activation request is notified based on the arrival probability, the notice is made in a descending order of the arrival probability. However, other information may be used instead of the arrival probability. For example, in the case of notifying the proxy activation request using the energy expended when the remote activating device transmits the activation signal, the request can be made in order starting from the remote activating device that is small in energy expended by activation.

The present embodiment has been described in connection with an example in which the three remote activating devices are disposed, but four or more remote activating devices may be disposed.

<Seventh Embodiment>

Next, a remote activating device according to a seventh embodiment will be described.

Configurations of the remote activating device and a device to be activated according to the seventh embodiment are the same as the configurations of the remote activating device 2100 and the device to be activated 2200 according to the fourth embodiment, respectively, and a redundant description thereof will not be repeated. A description will be made focusing on a different point. The device to be activated 2200 of the present embodiment can simultaneously use a plurality of interfaces as the standby interface. In the first to sixth embodiments, it has been described that the remote activating device and the device to be activated are used in a fixed environment. However, a remote activating system of the present embodiment provides an environment in which either of the remote activating device and the device to be activated moves. For example, the remote activating device or the device to be activated is a notebook computer or various handheld devices.

Figures 28, 29:
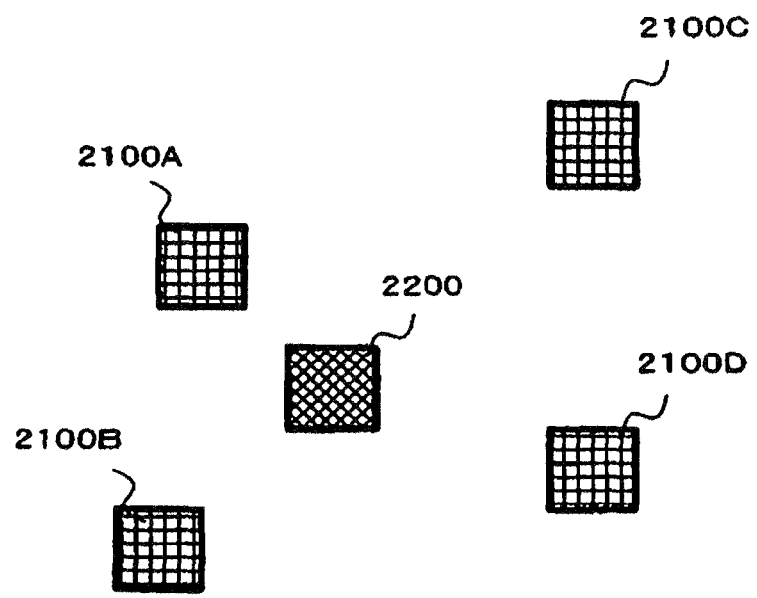
FIG. 28 is a diagram illustrating a remote activating system according to a seventh embodiment of the present invention.
FIG. 29 is a diagram illustrating an example of activation information database stored in a remote activating device and a device to be activated according to the seventh embodiment of the present invention.

FIG. 28 is a diagram illustrating the remote activating system according to the seventh embodiment. As illustrated in FIG. 28, the remote activating system according to the seventh embodiment includes four remote activating devices 2100A, 2100B, 2100C, and 2100D, and one device to be activated 2200. In an operation of the remote activating system according to the seventh embodiment, the transmitting interface deciding process, the standby interface deciding process, and the standby interface notifying process are the same as the processes of the fourth embodiment described in FIG. 19 in the remote activating system according to the fourth embodiment.

As a result of performing the three processes between each of the four remote activating devices 2100A, 2100B, 2100C, and 2100C and the device to be activated 2200, the storage unit 108 of each of the remote activating devices 2100A, 2100B, 2100C, and 2100D and the storage unit 207 of the device to be activated 2200 includes an activation signal information database illustrated in FIG. 29.

The following description will be made in connection with an example in which the standby interface of the device to be activated 2200 changes when the remote activating device 2100A has moved. As illustrated in the activation signal information database of FIG. 29, the device to be activated 2200 uses the first interface and the second interface as the standby interface before the remote activating device 2100A moves.

The activation signal transmitting interface (the first interface) periodically performs a keep-alive operation with respect to the standby interface (the first interface) of the device to be activated 2200 between the remote activating device 2100A and the device to be activated 2200. The activation signal transmitting interfaces (the second interfaces) of the remote activating device 2100B and the remote activating device 2100D periodically perform a keep-alive operation with respect to the standby interface (the second interface) of the device to be activated 2200.

In this state, the remote activating device 2100A moves, and the device to be activated 2200 detects that the keep-alive operation is not performed via the first interface. When it is detected that the keep-alive operation is not performed via the first interface, the device to be activated 2200 retrieves the activation information database of FIG. 29. When it is confirmed that there is no remote activating device that transmits the activation signal using the first interface, the device to be activated 2200 suspends the standby by the first interface. When the standby is suspended, a location of the activation information database assigned as the first interface is updated to the second interface, and the information may be re-shared between each of the remote activating devices 2100A, 2100B, 2100C, and 2100D and the device to be activated 2200.

Through the above operation, the device to be activated 2200 can suspend the standby by the interface having no possibility of receiving the activation signal, and thus a possibility that the device to be activated will be wrongly activated by a wrongful activation signal or radio wave noise can be reduced. Further, power consumption can be reduced.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A remote activating device that remotely activates a device to be activated connected to a first network and a second network, comprising:
a first interface connected to the first network;
a second interface connected to the second network, the second interface having a different communication coverage than the first interface;
an arrival confirmation processing unit that transmits an arrival attribute confirmation signal to the device to be activated a plurality of times using the first interface and checks how many times the arrival attribute confirmation signal has arrived at the device to be activated;
a judging unit that selects the first interface as an activation signal transmitting interface for transmitting an activation signal for remotely activating the device to be activated when the number of arrivals is larger than a predetermined value and selects the second interface as the activation signal transmitting interface when the number of arrivals is smaller than the predetermined value; and
an activating unit that transmits the activation signal using the activation signal transmitting interface selected by the judging unit,
wherein the arrival confirmation processing unit receives an arrival attribute notice representing how many times the arrival attribute confirmation signal arrives from the device to be activated via the second interface and confirms how many times the arrival attribute confirmation signal arrives at the device to be activated.

2. The remote activating device according to claim 1, wherein the communication coverage of the first interface is smaller than the communication coverage of the second interface.

3. The remote activating device according to claim 1, wherein the first interface consumes relatively low power to operate as compared with the second interface.

4. The remote activating device according to claim 1, wherein the judging unit determines a number of transmissions of the activation signal based on how many times the arrival attribute confirmation signal is transmitted and how many times the arrival attribute confirmation signal arrives.

5. The remote activating device according to claim 4, further comprising a storage unit that stores information on another remote activating device that has performed a process of confirming whether or not the arrival attribute confirmation signal arrives at the device to be activated,
wherein the arrival confirmation processing unit notifies the device to be activated of information of the activation signal transmitting interface when the activation signal transmitting interface is selected, receives information of an activation signal receiving interface to receive the activation signal from the device to be activated, and transmits a notice that requests other remote activating devices to activate the device to be activated when a network connected to the activation signal transmitting interface does not match a network connected to the activation signal receiving interface.

6. The remote activating device according to claim 5, wherein the storage unit stores information of the activation signal transmitting interface of the other remote activating devices in association with information of the activation signal receiving interface of the device to be activated, for each of the other remote activating devices, and
the arrival confirmation processing unit updates information of the activation signal receiving interface of the device to be activated with information of the received activation signal receiving interface when information of the activation signal receiving interface is received from the device to be activated, and transmits the notice that requests a remote activating device, in which the information of the activation signal transmitting interface matches the information of the activation signal receiving interface among the other remote activating devices, to activate the device to be activated.

7. The remote activating device according to claim 6, wherein the storage unit stores an arrival probability calculated based on the number of transmissions and the number of arrivals of the confirmation signal for each of the other remote activating devices, and
the arrival confirmation processing unit transmits a notice that requests another remote activating device having a higher arrival probability to activate the device to be activated.

8. The remote activating device according to claim 7, wherein the activating unit transmits the activation signal to the device to be activated when a notice that requests activation of the device to be activated is received.

9. A remote device to be activated connected to a first network and a second network, comprising:
a first interface connected to the first network;
a second interface connected to the second network, the second interface having a different communication coverage than the first interface;

a confirmation signal detecting unit that detects how many times an arrival attribute confirmation signal is transmitted from a remote activating device using the first interface and generates an arrival attribute notice representing how many times the arrival attribute confirmation signal arrives;

an arrival attribute notifying unit that notifies the remote activating device of the arrival attribute notice generated by the confirmation signal detecting unit using the second interface; and a selected interface receiving unit that receives information of an activation signal transmitting interface selected by the remote activating device based on the arrival attribute notice notified from the arrival attribute notifying unit.

10. The remote device to be activated according to claim 9, wherein the communication coverage of the first interface is smaller than the communication coverage of the second interface.

11. The remote device to be activated according to claim 9, wherein the first interface consumes relatively low power to operate as compared with the second interface.

12. A computer program product having a non-transitory computer readable medium including programmed instructions for outputting information, wherein the instructions comprise instructions which, when executed by a remote activating device that remotely activates a device to be activated connected to a first network and a second network, cause the remote activating device to perform:

transmitting an arrival attribute confirmation signal to the device to be activated a plurality of times using a first interface connected to the first network and checking how many times the arrival attribute confirmation signal has arrived at the device to be activated;

selecting the first interface as an activation signal transmitting interface for transmitting an activation signal for remotely activating the device to be activated when the number of arrivals is larger than a predetermined value and selecting the second interface connected to the second network as the activation signal transmitting interface when the number of arrivals is smaller than the predetermined value, the second interface having a different communication coverage than the first interface; and transmitting the activation signal using the selected activation signal transmitting interface.

* * * * *